United States Patent
Kojima et al.

(10) Patent No.: US 10,732,958 B2
(45) Date of Patent: Aug. 4, 2020

(54) TERMINAL DEVICE AND SOFTWARE REWRITING PROGRAM

(71) Applicant: Yanmar Co., Ltd., Osaka-shi, Osaka-fu (JP)

(72) Inventors: Yusuke Kojima, Osaka (JP); Shintaro Ishimoto, Osaka (JP); Masaki Matsuo, Osaka (JP); Shunzo Yamashita, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 16/081,376

(22) PCT Filed: Feb. 20, 2017

(86) PCT No.: PCT/JP2017/006113
§ 371 (c)(1),
(2) Date: Aug. 30, 2018

(87) PCT Pub. No.: WO2017/150247
PCT Pub. Date: Sep. 8, 2017

(65) Prior Publication Data
US 2019/0073211 A1     Mar. 7, 2019

(30) Foreign Application Priority Data

Mar. 1, 2016   (JP) .................................. 2016-038928

(51) Int. Cl.
*G06F 9/44*     (2018.01)
*G06F 8/65*     (2018.01)
(Continued)

(52) U.S. Cl.
CPC .............. *G06F 8/65* (2013.01); *A01D 41/12* (2013.01); *B60R 16/02* (2013.01); *B60R 16/023* (2013.01);
(Continued)

(58) Field of Classification Search
CPC ... G06F 8/65; G06F 8/658; G06F 8/71; G06F 8/72; G06F 8/77; G06F 11/00; B60R 16/02; B60R 16/023; H04W 4/80; H04L 12/40
See application file for complete search history.

(56) References Cited

U.S. PATENT DOCUMENTS 4,788,637 A * 11/1988 Tamaru ..................... G06F 8/71
                                                                    370/474
5,175,856 A * 12/1992 Van Dyke ................. G06F 8/41
                                                                    711/E12.006
(Continued)

FOREIGN PATENT DOCUMENTS

EP        2811696 A1    10/2014
JP     2001-005649 A    1/2001
(Continued)

OTHER PUBLICATIONS

International Search Report dated Apr. 25, 2017 issued in corresponding PCT Application PCT/JP2017/006113.
(Continued)

*Primary Examiner* — Adam Lee
(74) *Attorney, Agent, or Firm* — Norton Rose Fulbright US LLP

(57) ABSTRACT

A terminal device for use in a software rewriting system configured to rewrite a software package of a control device, including a storage unit configured to store one or more pieces of source code in a text format for generating one or more pieces of object code in a binary format executable by the control device. The terminal device retrieves a piece of difference source code which is a difference in a piece of source code corresponding to a current piece of object code stored in the storage unit, generates a latest piece of source code based on the piece of difference source code retrieved and the one or more pieces of source code stored in the (Continued)

storage unit, converts the latest piece of source code into a latest piece of object code, and transmits the latest piece of object code obtained from the conversion to the control device.

19 Claims, 20 Drawing Sheets

(51) Int. Cl.
    *A01D 41/12*     (2006.01)
    *B60R 16/023*     (2006.01)
    *B60R 16/02*     (2006.01)
    *G06F 11/00*     (2006.01)
    *G06F 8/71*     (2018.01)
    *G06F 8/658*     (2018.01)
    *H04W 4/80*     (2018.01)
    *G06F 8/72*     (2018.01)
    *G06F 8/77*     (2018.01)
    *H04L 12/40*     (2006.01)

(52) U.S. Cl.
    CPC ............... *G06F 8/658* (2018.02); *G06F 8/71* (2013.01); *G06F 8/72* (2013.01); *G06F 8/77* (2013.01); *G06F 11/00* (2013.01); *H04L 12/40* (2013.01); *H04W 4/80* (2018.02)

(56) References Cited

U.S. PATENT DOCUMENTS

| | | | | |
|---|---|---|---|---|
| 5,347,627 | A * | 9/1994 | Hoffmann | G06F 9/451 715/762 |
| 5,608,910 | A * | 3/1997 | Shimakura | G06F 8/65 711/103 |
| 5,713,010 | A * | 1/1998 | Buzbee | G06F 8/443 714/E11.209 |
| 5,732,273 | A * | 3/1998 | Srivastava | G06F 11/3466 714/E11.2 |
| 5,815,720 | A * | 9/1998 | Buzbee | G06F 8/443 714/E11.209 |
| 5,835,773 | A * | 11/1998 | Dunn | G06F 8/443 717/158 |
| 5,848,422 | A * | 12/1998 | Sato | G06F 16/40 |
| 5,920,725 | A | 7/1999 | Ma et al. | |
| 6,009,274 | A * | 12/1999 | Fletcher | G06F 8/65 709/217 |
| 6,067,500 | A * | 5/2000 | Morimoto | G06F 8/65 340/988 |
| 6,106,574 | A * | 8/2000 | Baisley | G06F 8/42 717/140 |
| 6,305,009 | B1 * | 10/2001 | Goor | G06F 8/47 717/116 |
| 6,581,157 | B1 * | 6/2003 | Chiles | G06F 8/65 713/1 |
| 6,684,389 | B1 * | 1/2004 | Tanaka | G06F 8/41 717/140 |
| 6,687,901 | B1 * | 2/2004 | Imamatsu | G06F 8/65 455/418 |
| 6,877,037 | B1 * | 4/2005 | Adachi | G06F 8/65 709/227 |
| 7,409,677 | B1 * | 8/2008 | Leventhal | G06F 8/30 717/128 |
| 7,480,901 | B2 * | 1/2009 | Arenburg | H04M 1/72577 717/140 |
| 7,698,692 | B1 * | 4/2010 | Garud | G06F 11/3466 714/38.14 |
| 8,065,704 | B2 * | 11/2011 | Zhang | H04N 7/17318 717/170 |
| 8,095,924 | B2 * | 1/2012 | Choi | G06F 3/1204 717/173 |
| 8,219,977 | B1 * | 7/2012 | Stroomer | G06F 11/368 717/122 |
| 8,438,558 | B1 * | 5/2013 | Adams | G06F 8/658 717/170 |
| 8,473,938 | B1 * | 6/2013 | Feeser | G06F 8/65 717/168 |
| 8,726,264 | B1 * | 5/2014 | Allen | G06F 8/60 717/168 |
| 8,745,612 | B1 * | 6/2014 | Semenzato | G06F 8/65 717/170 |
| 8,954,951 | B1 * | 2/2015 | Cohen | G06F 8/65 717/168 |
| 9,250,875 | B1 * | 2/2016 | Gschwind | G06F 8/443 |
| 9,454,363 | B1 * | 9/2016 | Angell | G06F 8/65 |
| 2002/0144254 | A1 * | 10/2002 | Owada | G06F 8/658 717/171 |
| 2002/0188934 | A1 * | 12/2002 | Griffioen | G06F 8/65 717/170 |
| 2003/0143991 | A1 * | 7/2003 | Minear | H04W 8/245 455/419 |
| 2003/0158870 | A1 * | 8/2003 | Goodman | G06F 16/2365 |
| 2003/0158973 | A1 * | 8/2003 | Tsukada | G06F 8/65 719/327 |
| 2003/0236970 | A1 * | 12/2003 | Palmer | G06F 8/65 713/1 |
| 2004/0034861 | A1 * | 2/2004 | Ballai | G06F 8/65 719/321 |
| 2004/0045012 | A1 * | 3/2004 | Doraisamy | G06F 8/65 719/321 |
| 2004/0068724 | A1 * | 4/2004 | Gardner, III | G06F 8/65 717/173 |
| 2004/0083471 | A1 * | 4/2004 | Nam | G06F 8/65 717/168 |
| 2004/0148073 | A1 * | 7/2004 | Hawig | B60R 25/00 701/36 |
| 2005/0010916 | A1 * | 1/2005 | Hagen | G06F 8/65 717/170 |
| 2005/0132091 | A1 * | 6/2005 | Shibata | G06F 8/65 710/4 |
| 2005/0246702 | A1 * | 11/2005 | Yeh | G06F 8/65 717/170 |
| 2006/0026585 | A1 * | 2/2006 | Haselden | G06F 8/65 717/168 |
| 2006/0061789 | A1 * | 3/2006 | Yamaoka | G06F 8/65 358/1.13 |
| 2006/0074931 | A1 * | 4/2006 | Burka | G06F 8/54 |
| 2006/0184924 | A1 * | 8/2006 | Hsieh | G06F 8/51 717/140 |
| 2006/0218523 | A1 * | 9/2006 | Tatsumi | G06F 8/355 717/106 |
| 2006/0225069 | A1 * | 10/2006 | Yuuki | G06F 8/65 717/170 |
| 2006/0236310 | A1 * | 10/2006 | Domeika | G06F 8/443 717/140 |
| 2007/0266378 | A1 * | 11/2007 | Fukuda | G06F 8/355 717/139 |
| 2008/0040401 | A1 * | 2/2008 | Reinsch | G06F 8/658 |
| 2008/0052698 | A1 * | 2/2008 | Olson | G06F 9/44589 717/168 |
| 2008/0134165 | A1 * | 6/2008 | Anderson | G06F 8/65 717/173 |
| 2008/0172649 | A1 * | 7/2008 | Bisso | G06F 8/65 717/121 |
| 2008/0178170 | A1 * | 7/2008 | Abe | G06F 8/65 717/170 |
| 2008/0288935 | A1 * | 11/2008 | Kawaguchi | G06F 8/65 717/172 |
| 2008/0307406 | A1 * | 12/2008 | John | G05B 19/0426 717/171 |
| 2008/0319959 | A1 * | 12/2008 | Bireley | G06F 8/447 |
| 2009/0037887 | A1 * | 2/2009 | Chavan | G06F 11/3636 717/128 |
| 2009/0172338 | A1 * | 7/2009 | Eker | G06F 8/658 711/173 |
| 2009/0271768 | A1 * | 10/2009 | Goodson | G06F 11/3624 717/125 |
| 2009/0307674 | A1 * | 12/2009 | Ng | G06F 8/4441 717/160 |

(56) References Cited

U.S. PATENT DOCUMENTS

| | | | |
|---|---|---|---|
| 2010/0083224 A1* | 4/2010 | Arnold | G06F 8/656 717/110 |
| 2010/0095290 A1* | 4/2010 | Miwa | G06F 8/65 717/170 |
| 2010/0169876 A1* | 7/2010 | Mann | G06F 8/65 717/170 |
| 2010/0211770 A1* | 8/2010 | Alrabady | G06F 21/62 713/150 |
| 2010/0257515 A1 | 10/2010 | Bates et al. | |
| 2011/0010696 A1* | 1/2011 | Lobo | G06F 8/4434 717/151 |
| 2011/0107322 A1* | 5/2011 | Hashiguchi | G06F 8/65 717/170 |
| 2011/0113340 A1* | 5/2011 | Miyazawa | G06F 9/445 715/736 |
| 2011/0197187 A1* | 8/2011 | Roh | G06F 8/65 717/173 |
| 2011/0288840 A1* | 11/2011 | Kropinski | G06F 17/5009 703/8 |
| 2012/0036514 A1* | 2/2012 | Master | G06F 8/45 718/104 |
| 2012/0110546 A1* | 5/2012 | Jo | G06F 8/36 717/107 |
| 2013/0198730 A1* | 8/2013 | Munireddy | G06F 8/654 717/170 |
| 2013/0346960 A1* | 12/2013 | Gupta | G06F 8/65 717/170 |
| 2014/0130028 A1* | 5/2014 | Maeda | G06F 8/71 717/170 |
| 2014/0189674 A1* | 7/2014 | Nagao | G06F 8/658 717/170 |
| 2014/0237462 A1* | 8/2014 | Zheng | G06F 8/62 717/170 |
| 2014/0245278 A1* | 8/2014 | Zellen | G06F 8/65 717/170 |
| 2014/0245284 A1 | 8/2014 | Alrabady et al. | |
| 2014/0380295 A1* | 12/2014 | Chen | G06F 8/65 717/170 |
| 2015/0100953 A1* | 4/2015 | Yim | G06F 8/65 717/170 |
| 2015/0106774 A1* | 4/2015 | Yasunaka | G06F 17/505 716/102 |
| 2015/0301822 A1* | 10/2015 | Takahashi | G06F 13/00 717/173 |
| 2015/0370551 A1* | 12/2015 | Mahajan | G06F 8/43 717/170 |
| 2016/0182088 A1* | 6/2016 | Sipos | G06F 3/064 714/764 |
| 2016/0189535 A1* | 6/2016 | Huang | G05B 15/02 340/12.5 |
| 2016/0285863 A1* | 9/2016 | Canavor | H04L 63/0823 |
| 2016/0299754 A1* | 10/2016 | Wei | H04W 4/023 |
| 2016/0306337 A1* | 10/2016 | Gandelsman | G05B 19/058 |
| 2016/0328227 A1* | 11/2016 | Kharbanda | G06F 8/656 |
| 2017/0033989 A1* | 2/2017 | Toprani | H04L 41/0846 |
| 2017/0090910 A1* | 3/2017 | DeLuca | G06F 8/654 |
| 2017/0178513 A1* | 6/2017 | Davis | H04W 4/80 |
| 2018/0246711 A1* | 8/2018 | Kurosawa | B60K 35/00 |
| 2019/0026098 A1* | 1/2019 | Yamashita | H04W 4/80 |

FOREIGN PATENT DOCUMENTS

| | | |
|---|---|---|
| JP | 2009-123226 A | 6/2009 |
| JP | 2010-198155 A | 9/2010 |
| JP | 2015-170195 A | 9/2015 |

OTHER PUBLICATIONS

European Search Report dated Feb. 15, 2019 issued in corresponding European Application No. 17759713.5.
Canadian Office Action dated Jun. 25, 2019 issued in corresponding Canadian Application No. 3016285.

* cited by examiner

FIG. 4

| MODEL INFORMATION OF MOVABLE OBJECT | |
|---|---|
| TYPE OF MOVABLE OBJECT | MODEL CODE |
| COMBINE HARVESTER | WRK1 |
| | WRK2 |
| | ... |
| ... | ... |
| PLEASURE BOAT | BT1 |
| | BT2 |
| | ... |
| ... | ... |

Labels: MT, DB1, MI, MC, 133

FIG. 5

| MT<br>TYPE OF MOVABLE OBJECT | MI MODEL INFORMATION OF MOVABLE OBJECT | | | | VR | RI DB2 YMDA 133 | |
|---|---|---|---|---|---|---|---|
| | MC<br>MODEL CODE | CC<br>CONTROL DEVICE CODE | WFWC<br>UPDATING SOFTWARE CODE | | UPDATE INFORMATION | | |
| | | | | | VERSION | DATE AND TIME | |
| COMBINE HARVESTER | WRK1 | WRK1ECU1 | WRK1ECU1FW1 | | 1.0 | 2015/1/20 12:00 | |
| | | | WRK1ECU1FW2 | | 1.1 | 2015/6/1 13:00 | |
| | | | WRK1ECU1FW3 | | 1.2 | 2015/11/5 11:00 | |
| | | WRK1ECU2 | WRK1ECU2FW1 | | 1.0 | 2014/3/15 12:00 | |
| | | | WRK1ECU2FW2 | | 1.1 | 2014/7/21 14:00 | |
| | | ... | ... | | ... | ... | |
| | WRK2 | WRK2ECU1 | WRK2ECU1FW1 | | 1.0 | 2013/12/25 10:00 | |
| | | WRK2ECU2 | WRK2ECU2FW1 | | 1.1 | 2014/2/10 9:00 | |
| | | ... | ... | | ... | ... | |
| | ... | ... | ... | | ... | ... | |
| PLEASURE BOAT | BT1 | BT1ECU1 | BT1ECU1FW1 | | 1.0 | 2015/6/1 16:00 | |
| | | | BT1ECU1FW2 | | 1.1 | 2015/9/15 12:00 | |
| | | BT1ECU2 | BT1ECU2FW1 | | 1.0 | 2014/4/11 14:00 | |
| | | | BT1ECU2FW2 | | 1.1 | 2014/7/1 15:00 | |
| | | | BT1ECU2FW3 | | 1.2 | 2015/1/10 16:00 | |
| | | ... | ... | | ... | ... | |
| | BT2 | BT2ECU1 | BT2ECU1FW1 | | 1.0 | 2015/4/22 18:00 | |
| | | ... | ... | | ... | ... | |
| | ... | ... | ... | | ... | ... | |
| ... | | | | | | | |

| WFWC UPDATING SOFTWARE CODE | DB3 OLD VERSION | LATEST VERSION | DSC(WFW) DIFFERENCE SOURCE CODE |
|---|---|---|---|
| WRK1ECU1FW1 | 1.0 | 1.2 | WRK1ECU1FW10_12.TXT |
| WRK1ECU1FW2 | 1.1 | 1.2 | WRK1ECU1FW11_12.TXT |
| WRK1ECU1FW3 | — | 1.2 | — |
| WRK1ECU2FW1 | 1.0 | 1.1 | WRK1ECU1FW10_11.TXT |
| WRK1ECU2FW2 | — | 1.1 | — |
| ... | ... | ... | ... |
| WRK2ECU1FW1 | — | 1.0 | — |
| WRK2ECU2FW1 | — | 1.1 | — |
| ... | ... | ... | ... |
| BT1ECU1FW1 | 1.0 | 1.1 | BT1ECU1FW10_11.TXT |
| BT1ECU1FW2 | — | 1.2 | — |
| BT1ECU2FW1 | 1.0 | 1.2 | BT1ECU2FW10_12.TXT |
| BT1ECU2FW2 | 1.1 | 1.2 | BT1ECU2FW11_12.TXT |
| BT1ECU2FW3 | — | 1.2 | — |
| ... | ... | ... | ... |
| BT2ECU1FW1 | — | 1.1 | — |
| ... | ... | ... | ... |

FIG. 7

| ID | AR | MC | CC | VR |
|---|---|---|---|---|
| TERMINAL IDENTIFICATION INFORMATION | AREA INFORMATION | MODEL CODE | CONTROL DEVICE CODE | CURRENT VERSION |
| #0001 | A1 | WRK1 | WRK1ECU1 | 1.0 |
|  |  |  | WRK1ECU2 | 1.0 |
|  |  |  | ... | ... |

| ID | AR | MC | CC | VR |
|---|---|---|---|---|
| TERMINAL IDENTIFICATION INFORMATION | AREA INFORMATION | MODEL CODE | CONTROL DEVICE CODE | CURRENT VERSION |
| #0002 | A1 | WRK2 | WRK2ECU1 | 1.0 |
|  |  |  | WRK2ECU2 | 1.1 |
|  |  |  | ... | ... |

| ID | AR | MC | CC | VR |
|---|---|---|---|---|
| TERMINAL IDENTIFICATION INFORMATION | AREA INFORMATION | MODEL CODE | CONTROL DEVICE CODE | CURRENT VERSION |
| #0003 | A3 | WRK1 | WRK1ECU1 | 1.1 |
|  |  |  | WRK1ECU2 | 1.0 |
|  |  |  | ... | ... |

| ID | AR | MC | CC | VR |
|---|---|---|---|---|
| TERMINAL IDENTIFICATION INFORMATION | AREA INFORMATION | MODEL CODE | CONTROL DEVICE CODE | CURRENT VERSION |
| #0004 | A3 | WRK1 | WRK1ECU1 | 1.2 |
|  |  |  | WRK1ECU2 | 1.1 |
|  |  |  | ... | ... |

| ID | AR | MC | CC | VR |
|---|---|---|---|---|
| TERMINAL IDENTIFICATION INFORMATION | AREA INFORMATION | MODEL CODE | CONTROL DEVICE CODE | CURRENT VERSION |
| #0005 | A5 | BT2 | BT2ECU1 | 1.0 |
|  |  |  | ... | ... |

| ID | AR | MC | CC | VR |
|---|---|---|---|---|
| TERMINAL IDENTIFICATION INFORMATION | AREA INFORMATION | MODEL CODE | CONTROL DEVICE CODE | CURRENT VERSION |
| #0006 | A5 | BT1 | BT1ECU1 | 1.1 |
|  |  |  | BT1ECU2 | 1.2 |
|  |  |  | ... | ... |

FIG. 8

TERMINAL DEVICE 200(1)(DISTRIBUTION SOURCE)

230

| TERMINAL IDENTIFI-CATION INFORMATION ID | AR AREA INFOR-MATION | MC MODEL CODE | CC CONTROL DEVICE CODE | VR CURRENT VERSION | SC SOURCE CODE |
|---|---|---|---|---|---|
| #0001 | A1 | WRK1 | WRK1ECU1 | 1.0 | WRK1ECU1.TXT |
| | | | WRK1ECU2 | 1.0 | WRK1ECU2.TXT |
| | | | ... | ... | ... |
| #0002 | A1 | WRK2 | WRK2ECU1 | 1.0 | WRK2ECU1.TXT |
| | | | WRK2ECU2 | 1.1 | WRK2ECU2.TXT |
| | | | ... | ... | ... |

TERMINAL DEVICE 200(2)(DISTRIBUTION SOURCE)

230

| TERMINAL IDENTIFI-CATION INFORMATION ID | AR AREA INFOR-MATION | MC MODEL CODE | CC CONTROL DEVICE CODE | VR CURRENT VERSION | SC SOURCE CODE |
|---|---|---|---|---|---|
| #0003 | A3 | WRK1 | WRK1ECU1 | 1.1 | WRK1ECU1.TXT |
| | | | WRK1ECU2 | 1.0 | WRK1ECU2.TXT |
| | | | ... | ... | ... |
| #0004 | A3 | WRK1 | WRK1ECU1 | 1.2 | WRK1ECU1.TXT |
| | | | WRK1ECU2 | 1.1 | WRK1ECU2.TXT |
| | | | ... | ... | ... |

| AREA INFORMATION | MODEL INFORMATION OF MOVABLE OBJECT (DB1) | |
| --- | --- | --- |
| (AR) | TYPE OF MOVABLE OBJECT (MT) | MODEL CODE (MC) |
| A1 | COMBINE HARVESTER | WRK1 |
| | | WRK2 |
| | | ... |
| | ... | |
| A2 | COMBINE HARVESTER | WRK2 |
| | | ... |
| | ... | |
| A3 | COMBINE HARVESTER | WRK1 |
| | | ... |
| | ... | |
| A4 | PLEASURE BOAT | BT1 |
| | | ... |
| | ... | |
| A5 | PLEASURE BOAT | BT1 |
| | | BT2 |
| | | ... |
| | ... | |
| A6 | PLEASURE BOAT | BT2 |
| | | ... |
| | ... | |
| ... | ... | |

FIG. 11

TERMINAL IDENTIFICATION
INFORMATION (DISTRIBUTION
SOURCE)

133

DB4

| ID | AR<br>AREA<br>INFORMATION | RID<br>REGISTERED<br>TERMINAL IDENTIFI-<br>CATION INFORMATION | MC<br>MODEL CODE | RVR<br>UPDATE/NOT-UPDATE<br>OF LATEST VERSION |
|---|---|---|---|---|
| #1111 | A1 | #0001 | WRK1 | 0 |
|  |  | #0002 | WRK2 | 1 |
|  |  | ... | ... | ... |
| #2222 | A3 | #0003 | WRK1 | 0 |
|  |  | #0004 | WRK1 | 1 |
|  |  | ... | ... | ... |
| #3333 | A5 | #0005 | BT2 | 1 |
|  |  | #0006 | BT1 | 1 |
|  |  | ... | ... | ... |
| #4444 | A2 | #0007 | WRK2 | 1 |
|  |  | ... | ... | ... |
| #5555 | A6 | #0008 | BT2 | 1 |
|  |  | ... | ... | ... |
| #6666 | A1 | #0009 | WRK1 | 0 |
|  |  | #0010 | WRK2 | 1 |
|  |  | ... | ... | ... |
| #7777 | A4 | #0011 | BT1 | 0 |
|  |  | ... | ... | ... |
| #8888 | A3 | #0012 | WRK1 | 1 |
|  |  | #0013 | WRK1 | 1 |
|  |  | ... | ... | ... |
| #9999 | A1 | #0014 | WRK1 | 0 |
|  |  | #0015 | WRK2 | 1 |
|  |  | ... | ... | ... |
| ... | ... | ... | ... | ... |

TERMINAL DEVICE AND SOFTWARE REWRITING PROGRAM

CROSS REFERENCES TO RELATED APPLICATIONS

This application is a national stage application pursuant to 35 U.S.C. 371 of International Application No. PCT/JP2017/006113, filed on Feb. 20, 2017, which claims priority under 35 U.S.C. § 119 to Japanese Patent Application No. 2016-038928, filed on Mar. 1, 2016, the disclosures of which are hereby incorporated by reference in their entireties.

TECHNICAL FIELD

The present invention relates to a terminal device and a software rewriting program for use in a software rewriting system configured to rewrite a software package of a control device (e.g., control device mounted in a movable object such as work machine or a ship).

BACKGROUND ART

As a software rewriting system for rewriting a software package of a control device, there is one, for example, which retrieves an updating software package for updating the software package of the control device with a use of a terminal device, and rewrites the software package of the control device based on the updating software package retrieved.

CITATION LIST

Patent Literature

PTL 1: Japanese Patent Application Laid-Open No. 2010-198155

SUMMARY OF INVENTION

Technical Problem

In such a software rewriting system for rewriting the software package of the control device by using the updating software package retrieved, if the entire data of the software package is transmitted to the terminal device, at a time of rewriting the software package of the control device, there is a problem of a transmission time required for transmitting the software package of the control device to the terminal device. This problem is particularly concerned in cases of an area with an underdeveloped communication infrastructure, where the communication cost is high or the communication speed is low.

In this regard, Patent Literature 1 (hereinafter, PTL 1) discloses a structure including: a first storage unit for storing a program (software package) of a first version; a second storage unit for storing a program (software package) of a version identical to the first version or a second version which is later than the first version; a retrieval unit configured to retrieve a difference between a program of a third version and the second version, the third version being a later version than the program of the second version; and an updating unit configured to create the program of the third version based on the program of the second version stored in the second storage unit and the difference retrieved by the retrieval unit, and store the program of the third version thus created in the first storage unit.

In PTL 1 however lacks description as to what the difference between programs (software packages) is, and what the software package of the latest version created based on the difference is like. Description of the document alone leaves it difficult to create a software package of the latest version from a difference in the software packages.

In view of the above, it is an object of the present invention to provide a terminal device and a software rewriting program for use in a software rewriting system configured to rewrite a software package of a control device, which enables shortening of a transmission time by utilizing information of a difference in the software package, and even allows easier generation of the latest version of the software package based on the difference in the software packages.

Solution to Problem

To achieve the above object, an aspect of the present invention provides a terminal device and software rewriting program as described below.

(1) Terminal Device

A terminal device related to an aspect of the present invention is a terminal device for use in a software rewriting system configured to rewrite a software package of a control device, the terminal device including: a storage unit configured to store one or more pieces of source code in a text format for generating one or more pieces of object code in a binary format executable by the control device. A piece of difference source code which is a difference in a piece of source code corresponding to a current piece of object code stored in the storage unit is retrieved. A latest piece of source code is generated based on the piece of difference source code retrieved and the one or more pieces of source code stored in the storage unit. The latest piece of source code generated is converted into a latest piece of object code. The latest piece of object code obtained from the conversion is transmitted to the control device.

(2) Software Rewriting Program

A software rewriting program related to an aspect of the present invention is a software rewriting program of a terminal device for use in a software rewriting system configured to rewrite a software package of a control device, wherein the terminal device includes a storage unit configured to store one or more pieces of source code in a text format for generating one or more pieces of object code in a binary format executable by the control device, and a computer. The software rewriting program is configured to cause the computer to execute the steps including: a retrieval control step of retrieving a piece of difference source code which is a difference in a piece of source code corresponding to a current piece of object code stored in the storage unit; a generating control step of generating a latest piece of source code based on the piece of difference source code retrieved in the retrieval control step and the one or more pieces of source code stored in the storage unit; a conversion control step of converting the latest piece of source code generated in the generating control step into a latest piece of object code; and a transmission control step of transmitting the latest piece of object code obtained in the conversion control step to the control device.

The above-description reading "a piece of source code in a text format" refers to a piece of human-recognizable source code written in a program language (e.g., a non-machine language such as C language), using a set of character code. Further, the above-description reading "a piece of object code in a binary format" is a piece of binary source code which is a machine language in an executable state by the control device.

The terminal device and the software rewriting program of the above-described aspects of the present invention may be such that the control device is mounted in a movable object.

The terminal device of the above-described aspect of the present invention may be such that the terminal device is provided in the movable object, and includes a short-range wireless communication unit configured to perform communication with at least one other movable object different from the movable object, via a short-range wireless communication network. A software rewriting program of the above-described aspect of the present invention may be such that the terminal device is provided in the movable object, and includes a short-range wireless communication unit configured to perform communication with at least one other movable object different from the movable object, via a short-range wireless communication network.

The terminal device of the above-described aspect of the present invention may be such that the latest piece of object code is transmitted to the control device of the movable object of its own and/or transmitted to the at least one other movable object via the short-range wireless communication unit and the short-range wireless communication network. A software rewriting program of the above-described aspect of the present invention may be such that, in the transmission control step, the latest piece of object code is transmitted to the control device of the movable object of its own and/or transmitted to the at least one other movable object via the short-range wireless communication unit and the short-range wireless communication network.

The terminal device of the above-described aspect of the present invention may be such that the at least one other movable object includes the terminal device related to the above-aspect of the present invention, and the piece of difference source code is transmitted to the at least one other movable object via the short-range wireless communication unit and the short-range wireless communication network. A software rewriting program of the above-described aspect of the present invention may be such that the at least one other movable object includes the terminal device related to the above-aspect of the present invention, and in the transmission control step, the piece of difference source code is transmitted to the at least one other movable object via the short-range wireless communication unit and the short-range wireless communication network.

The terminal device of the above-described aspect of the present invention may be such that the control device is mounted in an electric device, and the terminal device functions as a multi-function portable communication terminal device and includes a short-range wireless communication unit configured to perform communication with the electric device via the short-range wireless communication network. A software rewriting program of the above-described aspect of the present invention may be such that the control device is mounted in an electric device, and the terminal device functions as a multi-function portable communication terminal device and includes a short-range wireless communication unit configured to perform communication with the electric device via the short-range wireless communication network.

The terminal device of the above-described aspect of the present invention may be such that the latest piece of object code is transmitted to the electric device via the short-range wireless communication unit and the short-range wireless communication network. A software rewriting program of the above-described aspect of the present invention may be such that, in the transmission control step, the latest piece of object code is transmitted to the electric device via the short-range wireless communication unit and the short-range wireless communication network.

The terminal device of the above-described aspect of the present invention may be such that the electric device includes the terminal device related to the above-aspect of the present invention, and the piece of difference source code is transmitted to the electric device via the short-range wireless communication unit and the short-range wireless communication network. A software rewriting program of the above-described aspect of the present invention may be such that the electric device includes the terminal device related to the above-aspect of the present invention, and in the transmission control step, the piece of difference source code is transmitted to the electric device via the short-range wireless communication unit and the short-range wireless communication network.

Advantageous Effects of Invention

With the above-described aspect of the present invention, a transmission time can be shortened by utilizing information of a difference in the software package, and even allows easier generation of the latest version of the software package based on the difference in the software packages.

BRIEF DESCRIPTION OF DRAWINGS

FIG. 4 is a schematic view showing an exemplary data structure of a model information management database in the storage unit provided to the server.

FIG. 5 is a schematic view showing an exemplary data structure of an updating software management database in the storage unit provided to the server.

FIG. 6 is a schematic view showing an exemplary data structure of the updating software storage database in the storage unit provided to the server.

FIG. 7 is a schematic view showing an exemplary data structure of a state in which the current version of a software package for a control device is registered in the storage unit of the terminal device.

FIG. 8 is a schematic view showing an exemplary data structure of a state in which pieces of source code for the control device are registered in the storage unit of the terminal device (distribution source).

FIG. 10 is a schematic view showing an exemplary data structure with area information added in the model information management database shown in FIG. 4.

FIG. 11 is a schematic view showing an exemplary data structure of the area information management database constituting the updating software database in the storage unit provided to the server.

DESCRIPTION OF EMBODIMENTS

The following describes embodiments related to the present invention with reference to attached drawings. The following description deals with examples where the movable object, which is an example of the electric device, is an agricultural work machine such as a combine harvester, a tiller, a rice transplanter, and the like.

First Embodiment

Figure 1:
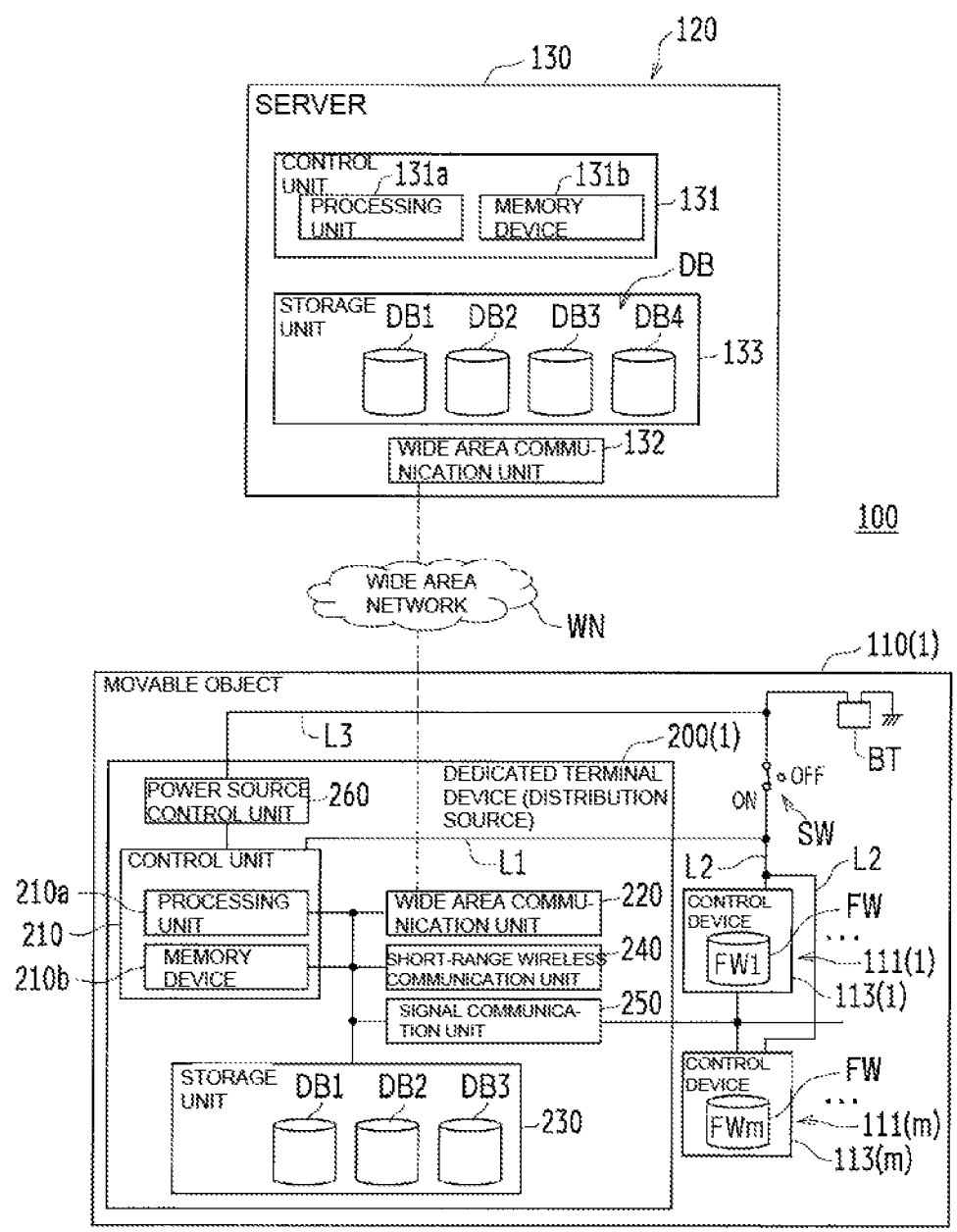
FIG. 1 is a structural diagram schematically showing an exemplary software rewriting system related to a first embodiment, and provides a schematic view of a state where a dedicated terminal device provided to a movable object out of a plurality of movable objects which could serve as a distribution source is communicating with a server via a wide area network.
Figure 2:
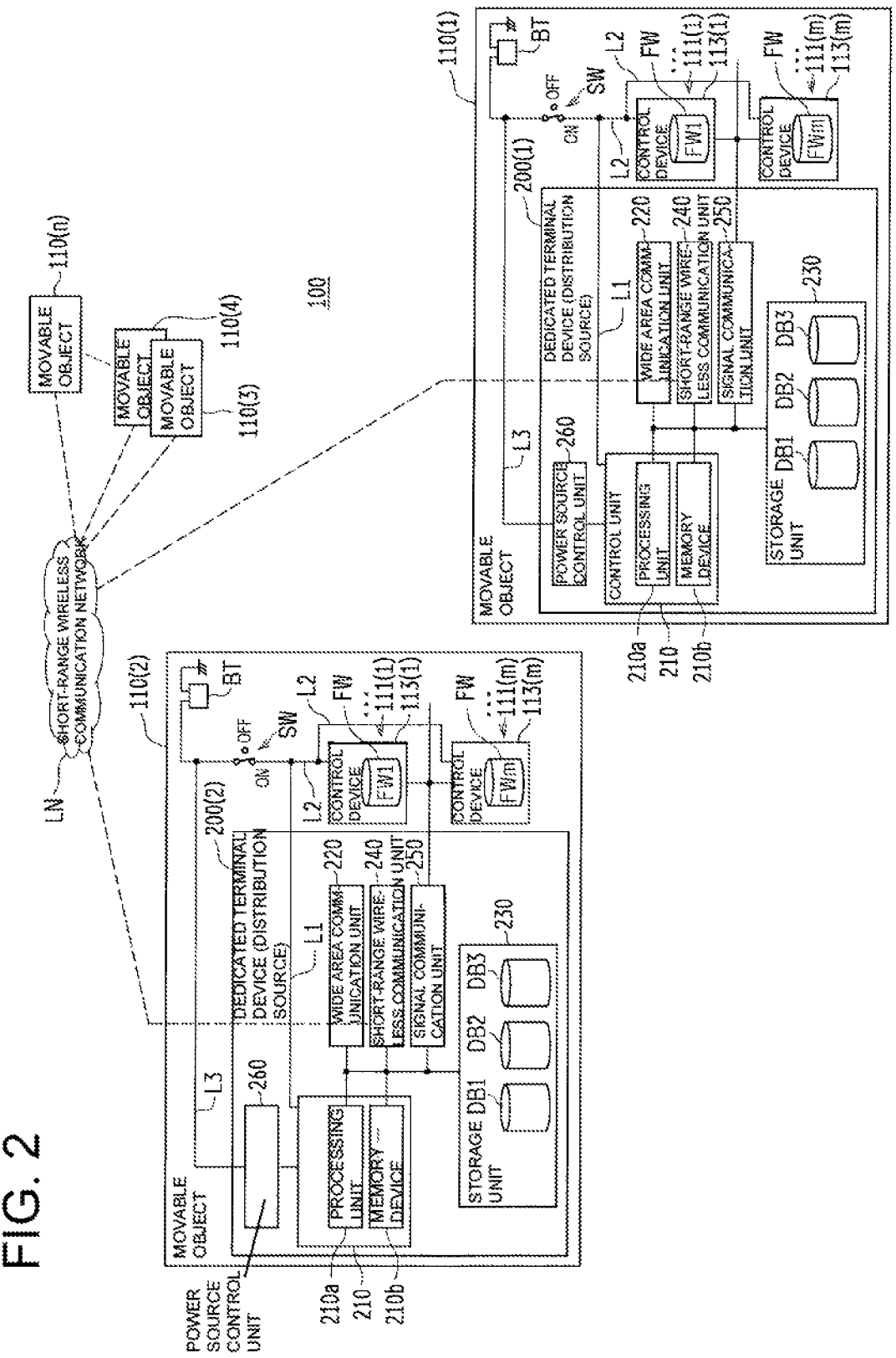
FIG. 2 is a schematic view showing a state where the dedicated terminal device having communicated with the server is communicating, via the short-range wireless communication network, with another dedicated terminal device that could serve as a distribution source, in the software rewriting system shown in FIG. 1.
Figure 3:
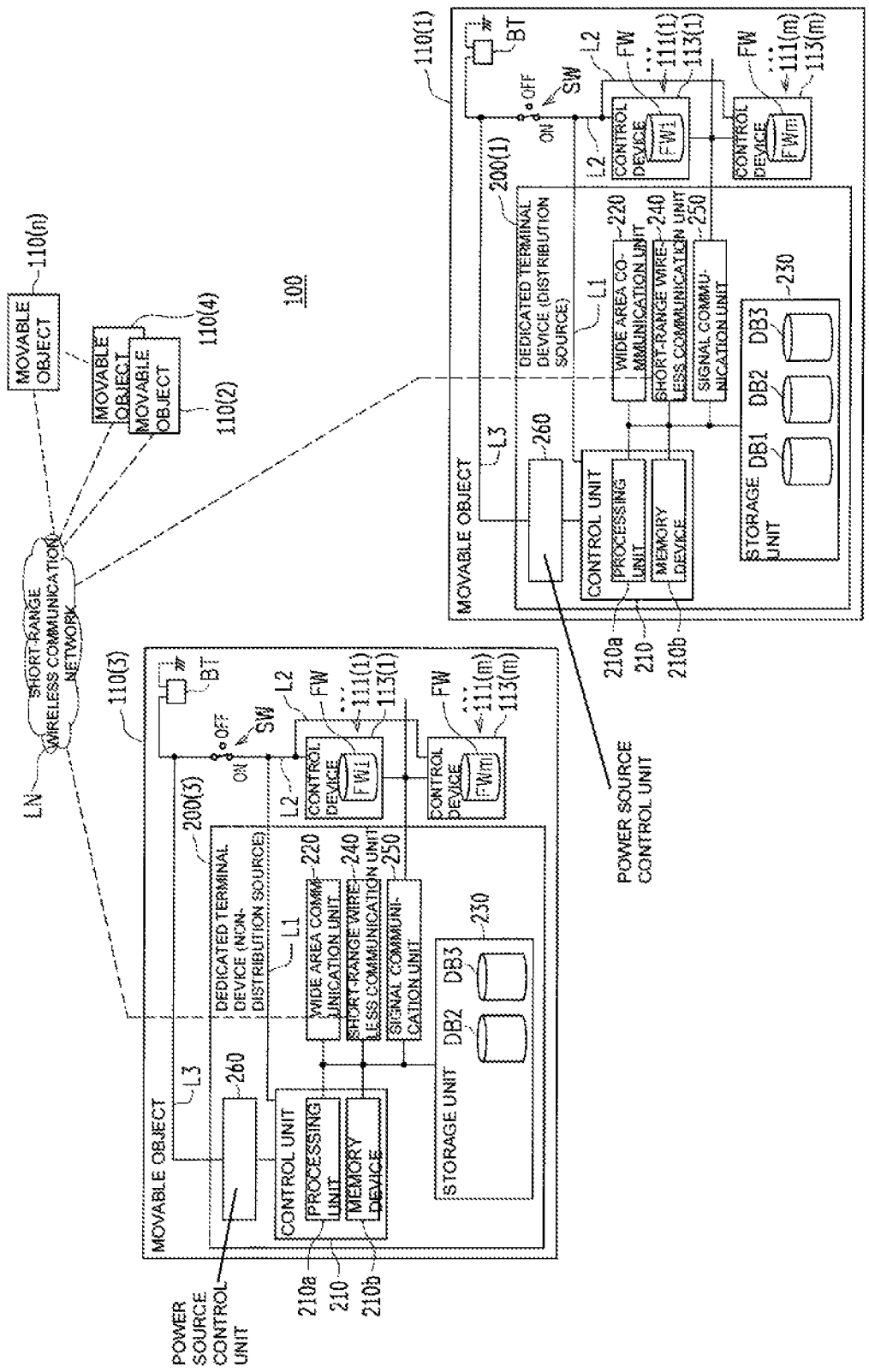
FIG. 3 is a schematic view showing a state where the dedicated terminal device having communicated with the server is communicating, via the short-range wireless communication network, with another dedicated terminal device that does not substantially serve as a distribution source, in the software rewriting system shown in FIG. 1.

FIG. 1 to FIG. 3 are structural view schematically showing an exemplary software rewriting system 100 related to a first embodiment.

FIG. 1 is a schematic view showing a state where a dedicated terminal device 200(1) provided to a movable object 110(1) that could serve as a distribution source, out of a plurality of movable objects 110(1) to 110($n$) (where n is an integer of 2 or more), is communicating with a server 130 via a wide area network WN. FIG. 2 is a schematic view showing a state where the dedicated terminal device 200(1) having communicated with the server 130 is communicating, via a short-range wireless communication network LN, with another dedicated terminal device 200 (2) that could serve as a distribution source, in the software rewriting system 100 shown in FIG. 1. FIG. 3 is a schematic view showing a state where the dedicated terminal device 200 (1) having communicated with the server 130 is communicating, via the short-range wireless communication network LN, with another dedicated terminal device 200 (3) that does not substantially serve as a distribution source, in the software rewriting system 100 shown in FIG. 1.

Further, FIG. 4 is a schematic view showing an exemplary data structure of a model information management database DB1 constituting an updating software database DB in the storage unit 133 provided to the server 130. Further, FIG. 5 is a schematic view showing an exemplary data structure of an updating software management database DB2 constituting the updating software database DB in the storage unit 133 provided to the server 130. Further, FIG. 6 is a schematic view showing an exemplary data structure of an updating software storing database DB3 constituting the updating software database DB in the storage unit 133 provided to the server 130. FIG. 7 is a schematic view showing an exemplary data structure of a state in which the current version VR of a software package FW (FW1 to FWm) for a control device [113(1) to 113($m$)] (where m is an integer of 1 or 2 or more) is registered in the storage unit 230 of the terminal device 200($i$). Further, FIG. 8 is a schematic view showing an exemplary data structure of a state in which pieces of source code SC for the control devices 113(1) to 113($m$) are registered in the storage unit 230 of the terminal device 200(1), 200(2) (distribution source).

The software rewriting system 100 shown in FIG. 1 to FIG. 3 is a system for rewriting software packages FW of control devices 113(1) to 113($m$) mounted in a plurality of movable objects 110(1) to 110($n$) (e.g., movable work machines, ships) (see FIG. 1 to FIG. 3). In this example, the control devices 113(1) to 113($m$) are each an electronic control unit (Electronic Control Units: ECU), and are mounted in the movable objects 110(1) to 110($n$). The software package FW is firmware.

The software rewriting system 100 includes: the plurality of movable objects 110(1) to 110($n$), the dedicated terminal devices 200(1) to 200($n$) provided to the plurality of movable objects 110(1) to 110($n$), and the server 130 (see FIG. 1) connected to the dedicated terminal devices 200(1) to 200($n$) via a wide area network WN (see FIG. 1).

In this example, the server 130 is a large information device (specifically stationary computer installed in a predetermined location). However, the server 130 is not limited to this, and may be information devices capable of storing the updating software database DB, e.g., a small information device having a storage unit with a sufficient capacity for the data size needed for the updating software database DB, more specifically, exclusive terminal devices 200(1) and 200(2) provided to the movable objects 110(1), 110(2), portable general-use terminal devices 300.

The terminal devices 200(1) to (n) include at least one terminal device that could serve as a distribution source for other terminal devices. The terminal devices 200(1) to (n) may include a terminal device that does not substantially serve as a distribution source for the other terminal devices.

It should be noted that the above expression reading "terminal device that does not substantially serve as a distribution source for the other terminal devices" means that the terminal device is capable of serving as a distribution source, provided that the distribution destination is a movable object of the same model; however is not able to serve as a distribution source if the distribution destination is of a different model; i.e., a terminal device that does not have pieces of model information MI except for its own (except the destination model(s)) and does not have updating software packages WFW (see FIG. 4 to FIG. 6) associated with the pieces of model information MI of the other models.

In the following descriptions, terminal devices 200(1) and 200(2) (distribution sources) are each a terminal device that could serve as a distribution source for the other terminal devices, whereas terminal devices 200(3) to 200(n) (non-distribution sources) are each a terminal device that does not substantially serve as a distribution source for the other terminal devices.

The terminal device 200(1) (distribution source) is capable of serving as a destination of updating software packages WFW distributed from the server 130, for updating the software package FW of the control device [113(1) to 113(m)], and as a distribution source for other terminal devices 200(2) to 200(n). Similarly, the terminal device 200(2) (distribution source) is capable of serving as a destination of updating software packages WFW distributed from the server 130 and as a distribution source for other terminal devices 200(1) and 200(3) to 200(n).

More Specifically, the terminal devices 200(1) and 200(2) (distribution sources) are each configured to receive, via a wide area network WN and the wide area communication unit 220, updating software packages WFW in the updating software database DB (see FIG. 4 to FIG. 6) of the server 130.

The updating software package WFW received from the server 130 is detailed later.

The terminal device 200(1) (distribution source) stores in the storage unit 230 thereof updating software packages WFW received from the server 130, and transmits an updating software package WFW stored in the storage unit 230, via its short-range wireless communication unit 240 and a short-range wireless communication network LN, to another terminal device, out of the other terminal devices 200(2) to 200(n), which can be communicated within a range of a short-range wireless communication.

Similarly, the terminal device 200(2) (distribution source) stores in the storage unit 230 thereof updating software packages WFW received from the server 130, and transmits an updating software package WFW stored in the storage unit 230, via its short-range wireless communication unit 240 and a short-range wireless communication network LN, to another terminal device, out of the other terminal devices 200(1) and 200(3) to 200(n), which can be communicated within a short-range wireless communication range.

Further, more specifically, the terminal device 200(1) (distribution source) randomly establishes communication with other terminal devices, out of the other terminal devices 200(2) to 200(n), which can be communicated via the short-range wireless communication unit 240 and the short-range wireless communication network LN within a short-range wireless communication range. The terminal device 200(1) then authenticates the other terminal devices out of the terminal devices 200(2) to 200(n) having established communication, and transmits an updating software package WFW stored in the storage unit 230 of the terminal device 200(1) to a terminal device 200(i) on the other end (where i is an integer ranging from 1 to n, corresponding to suffix of the terminal device on the other end), out of the terminal devices 200(2) to 200(n), which corresponds to a piece of model information MI (see FIG. 4) stored in the storage unit 230 of the terminal device 200(1) (distribution source).

Similarly, the terminal device 200(2) (distribution source) randomly establishes communication with other terminal devices, out of the other terminal devices 200(1) and 200(3) to 200(n), which can be communicated via the short-range wireless communication unit 240 and the short-range wireless communication network LN within a short-range wireless communication range. The terminal device 200(2) then transmits an updating software package WFW stored in the storage unit 230 of the terminal device 200(2) (distribution source) to a terminal device 200(i) on the other end, out of the terminal devices 200(1) and 200(3) to 200(n), which corresponds to a piece of model information MI (see FIG. 4) stored in the storage unit 230 of the terminal device 200(2) (distribution source).

The updating software package WFW to be transmitted to the terminal device 200(i) on the other end will be detailed later.

As shown in FIG. 1 to FIG. 3, the server 130 (see FIG. 1) in this example is arranged in a remote monitoring center 120 (see FIG. 1) in a position far apart from the movable objects 110(1) to 110(n) in this example, and is configured to store information related to software packages FW of the control devices 113(1) to 113(m) mounted on the movable objects 110(1) to 110(n).

More specifically, the terminal devices 200(1) to 200(n) and the server 130 have wide area communication units 220 and 132 (specifically, wide area communication interfaces), and are connected with one another by their respective wide area communication units 220 and 132 via a wide area network WN (see FIG. 1), thereby enabling transmission/reception of information amongst the terminal devices 200 (1) to 200(n) and the server 130. This way, the server 130 allows the users to remotely monitor the movable objects 110(1) to 110(n) through the remote monitoring center 120. The terminal devices 200(1) to 200(n) in this example are each a remote monitoring terminal device. It should be noted that, depending on the situation, the wide area communication unit 220 does not have to be provided in the terminal devices 200(3) to 200(n).

Further, the server 130 can transmit, to the terminal device [200(1), 200(2)] (distribution source) of the movable object [110(1), 110(2)], information regarding the software packages FW of the control devices 113(1) to 113(m) in the movable objects 110(1) to 110(n). On the other hand, the terminal device [200(1), 200(2)] (distribution source) in the movable object [110(1), 110(2)] can receive, from the server 130, information regarding the software packages FW of the control devices 113(1) to 113(m) in the movable objects 110(1) to 110(n).

It should be noted that the wide area network WN may be a wired communication network, a wireless communication network (wireless communication network in compliance with a so-called mobile communication standard), or a combination of a wired communication network and a wireless communication network. Typically, the wide area network WN is a public line network provided by a telecommunications carrier; e.g., a public line network that allows terminals such as landline telephones and mobile phones to communicate with one another.

The movable objects 110(1) to 110(n) each includes one or a plurality of work units (a plurality of work units in this example) [111(1) to 111(m)] to [111(1) to 111(m)] (see FIG. 1 to FIG. 3); and terminal devices 200(1) to 200(n). For example, where the agricultural work machine is a combine harvester, examples of the work units 111(1) to 111(m) are a traveling work unit, a reaping work unit, a threshing work unit, and the like.

The work units 111(1) to 111(m) are provided with the control devices 113(1) to 113(m), respectively. Each of the control devices 113(1) to 113(m) instructs various actuators (not shown) to suitably control the operational states of the corresponding work unit [111(1) to 111(m)]. The control devices 113(1) to 113(m) are each configured to transfer data to one another based on a communication standard such as a CAN (Controller Area Network) standard or the like.

More specifically, the control devices 113(1) to 113(m) control the operational states of the work units 111(1) to 111(m), based on information (signal) of detection values from various sensors of the work units 111(1) to 111(m) and ON/OFF information of various switches. Further, the control devices 113(1) to 113(m) each determines as needed whether or not an abnormality such as breaking down of the movable object 110 is taking place, and if an abnormality is taking place, generates error information (specifically, an error code) corresponding to that abnormality.

A work unit 111, out of the work units 111(1) to 111(m), which operates an engine (not shown) includes: an engine; a control device 113 configured to monitor the rotational speed and the load condition of the engine and control the entire engine by instructing a suitable injection pressure and an injection timing to the combustion system; an electric power generator (not shown); and a start switch SW, and a battery BT is mounted thereto. Further, the control device 113 configured to control the entire engine controls operation start/stop, and operational states of driving by the engine, in addition to control of the work unit 111 that operates the engine.

It should be noted that, during an operating state of the engine by the work unit 111 operating the engine, the battery BT is suitably charged by electric power supplied from the electric power generator.

The start switch SW is a switch for selectively switching a power-on state and a power-off state. It should be noted that the power-on state is a state in which electric power is supplied from the battery BT to a control unit 210 and the control device [113(1) to 113(m)]. The power-off state is a state in which supply of electric power from the battery BT to a control unit 210 and the control device [113(1) to 113(m)] is shut-off.

More specifically, the battery BT is connected, via the start switch SW, to both a power source connection line L1 connected to the control unit 210 and a power source connection line L2 connected to the control device [113(1) to 113(m)].

In this example, the start switch is a switch so called key switch, and an on-terminal thereof is a connection terminal of the power source connection lines L1 and L2. An off-terminal is a terminal while the start switch SW is in the off state.

It should be noted that the battery BT and a power control unit 260 are connected via a power source connection line L3, irrespective of the ON/OFF state of the start switch SW.

[Server]

As shown in FIG. 1, the server 130 includes a control unit 131, a wide area communication unit 132, and the storage unit 133.

(Control Unit)

The control unit 131 includes: a processing unit 131a constituted by a so-called computer such as a CPU (Central Processing Unit); and a memory unit 131b including a volatile memory such as a ROM (Random Only Memory), a RAM (Random Access Memory).

The control unit 131 is configured to perform operation control of various structuring elements by having the processing unit 131a load a control program stored in advance in the ROM of the memory unit 131b into the RAM of the memory unit 131b, and running the program.

In the present embodiment, the control unit 131 controls transmission/reception of data during communications, various inputs and outputs, and arithmetic processing.

(Wide Area Communication Unit)

The wide area communication unit 132 is electrically connected to a data line of the control unit 131. With instructions from the control unit 131, the wide area communication unit 132 is able to perform communication using the same communication protocol as the wide area communication units 220 (see FIG. 1 to FIG. 3) of the terminal devices 200(1) to 200(n) of the movable objects 110(1) to 110(n). Data transmitted/received during communication is converted by the wide area communication unit 132 so as to comply with the communication protocol. The wide area communication unit 132 transmits information in the storage unit 133, which is related to the software packages FW of the control devices 113(1) to 113(m) in the movable objects 110(1) to 110(n), to the terminal devices 200(1) to 200(n) [terminal devices 200(1) and 200(2) in this example] in the movable objects 110(1) to 110(n) [movable objects 110(1) and 110(2) in this example].

(Storage Unit)

The storage unit 133 is electrically connected to a data line of the control unit 131. With instructions from the control unit 131, the storage unit 133 controls writing and reading of information. The storage unit 133, in this example, is a large-capacity storage unit such as a flush memory, or a hard disk device.

In the storage unit 133, the updating software database DB is stored.

When the type of the movable objects 110(i) on the other end (e.g., movable work machines, ships) are different, it goes without saying that the software packages FW of the control devices 113(1) to 113(m) mounted on the movable objects 110(i) on the other end may be different. Even if the movable objects 110(i) on the other end are the same type, the software packages FW of the control devices 113(1) to 113(m) mounted to the movable objects 110(i) of different models may be different. If the updating software packages WFW stored in the storage unit 230 are not for the software packages FW of the control devices 113(1) to 113(m) mounted to the movable objects 110(i) on the other end, the software packages FW of the control devices 113(1) to 113(m) of the movable objects 110(i) on the other end cannot be rewritten.

In view of the above, the updating software database DB stores updating software packages WFW in association with pieces of model information MI (see FIG. 4 to FIG. 6) of the movable objects 110(1) to 110(n). Further, the updating software database DB stores pieces of update information RI (see FIG. 5) of the updating software packages WFW.

In the present embodiment, the updating software database DB includes: the model information management database DB1 (see FIG. 4); the updating software management database DB2 (see FIG. 5); and the updating software storing database DB3 (see FIG. 6). An area information management database DB4 will be described later.

As shown in FIG. 4, the model information management database DB1 stores pieces of model information MI of the movable objects 110(1) to 110(n).

Specifically, in the model information management database DB1, the types MT of the movable objects 110(1) to 110(n), and model codes MC of the movable objects 110(1) to 110(n) are registered. More specifically, in the model information management database DB1, the movable objects 110(1) to 110(n) of all types MT produced by a manufacturer (e.g., movable work machines, ships), and model codes MC of all models of the movable objects 110(1) to 110(n) are registered.

When a new model is developed, the type MT and the model code MC of the movable object 110 is registered at any time in the model information management database DB1.

As shown in FIG. 5, the updating software management database DB2 stores updating software codes WFWC (updating firmware codes in this example) of the control devices 113(1) to 113(m) (ECU in this example) in the movable objects 110(1) to 110(n).

Specifically, in the updating software management database DB2, the types MT of the movable objects 110(1) to 110(n), the model codes MC of the movable objects 110(1) to 110(n), control device codes CC (ECU symbols and/or a number in this example) of the control devices 113(1) to 113(m), and the updating software codes WFWC associated with pieces of update information RI (version VR and/or date and time YMDT) are registered. More specifically, in the updating software management database DB2, the movable objects 110(1) to 110(n) of all types MT (e.g., movable work machines, ships) produced by a manufacturer, the model codes MC of all models of the movable objects 110(1) to 110(n), the control device codes CC of the control devices 113(1) to 113(m) in the movable objects 110(1) to 110(n), and updating software codes WFWC associated with pieces of update information RI are registered.

When a new model is developed, the type MT, the model code MC, the control device code CC, and the updating software code WFWC associated with a piece of update information RI of the movable object 110 are registered at any time in the updating software management database DB2. When a new version of a software package FW is developed, the piece of update information RI and the updating software code WFWC associated with the piece of update information RI are updated at any time in the updating software management database DB2.

As shown in FIG. 6, the updating software storing database DB3 stores pieces of difference source code DSC each of which piece is a difference in a piece of source code between the latest version and an old version of the updating software package WFW.

The above-description reading "difference in a piece of source code between the latest version and an old version" means a set of changes in the source code SC of the software package FW between its latest version and an old version (if there are a plurality of old versions, the expression means sets of all the changes from the oldest version to the immediately previous version). For example, if there are versions 1.0 and 1.1 in the market and the latest version is 1.2, the difference between the latest version and the old version means two sets of changes; i.e., a set of changes between the latest version 1.2 and the old version 1.0, and a set of changes between the latest version 1.2 and the old version 1.1. The same applies to cases with three or more older versions.

Specifically, in the updating software storing database DB3, updating software codes WFWC and pieces of difference source code DSC associated with the updating software codes WFWC are registered. More specifically, in the updating software storing database DB3, the movable objects 110(1) to 110(n) of all types MT produced by a manufacturer (e.g., movable work machines, ships), and pieces of difference source code DSC for all models of the movable objects 110(1) to 110(n) are registered.

When a new model or a new version of a software package FW is developed, the updating software code WFWC and a piece of difference source code DSC associated with the updating software code WFWC are registered at any time in the updating software storing database DB3.

Further, in the storage units 230 of the terminal devices 200(1) to 200(n) in the movable objects 110(1) to 110(n), pieces of model information MI and pieces of update information RI such as the versions VR and the like of the software packages FW of the control devices 113(1) to 113(m) are registered.

Specifically, as shown in FIG. 7, in each of the storage units 230 of the terminal devices 200(1) to 200(n), the pieces of model information MI (examples of model codes MC in this example), the control device codes CC, and the pieces of update information RI (examples of versions VR in this example) of software packages FW for the control devices 113(1) to 113(m) are registered in association with terminal identification information ID and the pieces of area information AR. It should be noted that, in this example, the model code MC is registered in the storage unit 230 as the piece of model information MI; however, type MT of each of the movable objects 110(1) to 110(n) may be registered instead of the model code MC. Further, in this example, the current version VR is registered as a piece of update information RI; however, the date and time YMDT of updating to the current version VR may be registered instead of or in addition to the current version VR.

Further, the storage unit 230 of each of the terminal devices 200(1) to 200(n) in the movable objects 110(1) to 110(n) stores pieces of source code SC in a text format, which are for generating pieces of object code OC (software package FW) in a binary format executable by the control devices 113(1) to 113(m). The above-description reading "pieces of source code SC in a text format" refers to a piece of human-recognizable source code written in a program language (e.g., a non-machine language such as C language), using a set of character code. Further, the above-description reading "pieces of object code OC in a binary format" is a piece of binary source code which is a machine language in an executable state by the control devices 113(1) to 113(m). A piece of object code OC is created through conversion (so-called compiling or assembling) of a piece of source code SC.

Specifically, as shown in FIG. 8, in each of the storage units 230 of the terminal devices 200(1) and 200(2) (distribution source), the pieces of model information MI (examples of model codes MC in this example), the control device codes CC, and the pieces of update information RI (examples of versions VR in this example), and pieces of source code SC of software packages FW for the control devices 113(1) to 113(m) are registered in association with terminal identification information ID and the pieces of area information AR. It should be noted that, in this example, the model code MC is registered in the storage unit 230 as the piece of model information MI; however, type MT of each of the movable objects 110(1) to 110(n) may be registered instead of the model code MC. Further, in this example, the current version VR is registered as a piece of update information RI; however, the date and time YMDT of updating to the current version VR may be registered instead of or in addition to the current version VR. Further, in cases of the terminal devices 200(3) to 200(n) (non-distribution source), pieces of source code SC to SC for only the control devices 113(1) to 113(m) of their own movable objects 110(3) to 110(n) may be stored as the pieces of source code SC shown in FIG. 8.

[Dedicated Terminal Device (Distribution Source)]

Next, a system configuration of the dedicated terminal device [200(1), 200(2)] (distribution source) is described with reference to FIG. 1 to FIG. 3.

Hardware Configuration of Dedicated Terminal Device (Distribution Source)

As shown in FIG. 1 to FIG. 3, the terminal devices 200(1) and 200(2) (distribution sources) each includes a control unit 210 (an example of computer), a wide area communication unit 220, a storage unit 230, a short-range wireless communication unit 240, a signal communication unit 250, and a power source control unit 260.

(Control Unit)

The control unit 210 includes: a processing unit 210a constituted by a so-called computer such as a CPU (Central Processing Unit); and a memory unit 210b including a volatile memory such as a ROM (Random Only Memory), a RAM (Random Access Memory).

The control unit 210 is configured to achieve various functions necessary for the control unit 210, by running programs such as software rewriting program PP (see FIG. 9 described later) which is stored (installed) in advance in the storage unit 230. Specifically, the control unit 210 is configured to perform various processes by having a processing unit 210a thereof load a program such as the software rewriting program PP stored in advance in the storage unit 230 into the RAM of the memory device 210b, and running that program. The RAM of the memory device 210b provides a working area to the control unit 210.

In the present embodiment, the control unit 210 controls transmission/reception of data during communications, various inputs and outputs, and arithmetic processing.

(Wide Area Communication Unit)

The wide area communication unit 220 is electrically connected to a data line of the control unit 210. With instructions from the control unit 210, the wide area communication unit 220 is able to perform communication using the same communication protocol as the wide area communication unit 132 (see FIG. 1) of the server 130. Data transmitted/received during communication is converted by the wide area communication unit 220 so as to comply with the communication protocol. Further, the wide area communication unit 220 receives, from the server 130, information regarding software packages FW of the control devices 113(1) to 113(m) in the movable objects 110(1) to 110(n), which information is stored in the storage unit 133 of the server 130.

(Storage Unit)

The storage unit 230 is electrically connected to a data line of the control unit 210. With instructions from the control unit 210, the storage unit 230 controls writing and reading of information. The storage unit 230, in this example, is a large-capacity storage unit such as a flush memory.

The storage unit 230 stores therein a model information management database DB1, an updating software management database DB2, and an updating software storing database DB3.

The data structures of the model information management database DB1, the updating software management database DB2, and the updating software storing database DB3 are similar to those of the model information management database DB1, the updating software management database DB2, and the updating software storing database DB3 stored in the storage unit 133 of the server 130 as shown in FIG. 4 to FIG. 6. Therefore, descriptions of them are omitted here.

(Short-Range Wireless Communication Unit)

The short-range wireless communication unit 240 in the terminal device 200(1) (distribution source) performs short-range wireless communication with the short-range wireless communication units 240 of the terminal device 200(2) (distribution source) and the terminal devices 200(3) to 200(n) (non-distribution sources). Further, the short-range wireless communication unit 240 in the terminal device 200(2) (distribution source) performs short-range wireless communication with the short-range wireless communication units 240 of the terminal device 200(1) (distribution source) and the terminal devices 200(3) to 200(n) (non-distribution sources).

Examples of the short-range wireless communication includes wireless communication of several meters to approximately 100 meters, such as wireless LAN (Local Area Network) communication which allows communication at a short distance of several tens of meters to approximately 100 meters, and wireless PAN (Personal Area Network) communication which allows communication at a short distance of several meters to several tens of meters.

An example of the wireless LAN communication is wireless LAN communication based on IEEE802.11 standard, typically WiFi (Registered Trademark) standard. An example of the wireless PAN communication is wireless PAN communication based on IEEE802.15 standard, typically Bluetooth (Registered Trademark) standard. In this example, the short-range wireless communication units 240 is configured to perform wireless LAN communication according to the IEEE 802.11 standard.

(Signal Communication Unit)

The signal communication unit 250 exchanges information with the control devices 113(1) to 113(m) of the work units 111(1) to 111(m), by communication according to a communication standard such as the CAN standard.

(Power Source Control Unit)

The power source control unit 260 supplies electric power to the control unit 210. In the present embodiment, the power source control unit 260 is connected to the battery BT irrespective of the ON/OFF state of the start switch SW. Specifically, an input end power source line (not shown) of the power source control unit 260 and the battery BT are connected via the power source connection line L3. This way, the electric power from the battery BT is always supplied to the power source control unit 260.

Further, to the control unit 210, the electric power from the battery BT is supplied via the power source control unit 260.

Software Configuration of Dedicated Terminal Device (Distribution Source)

Figure 9:
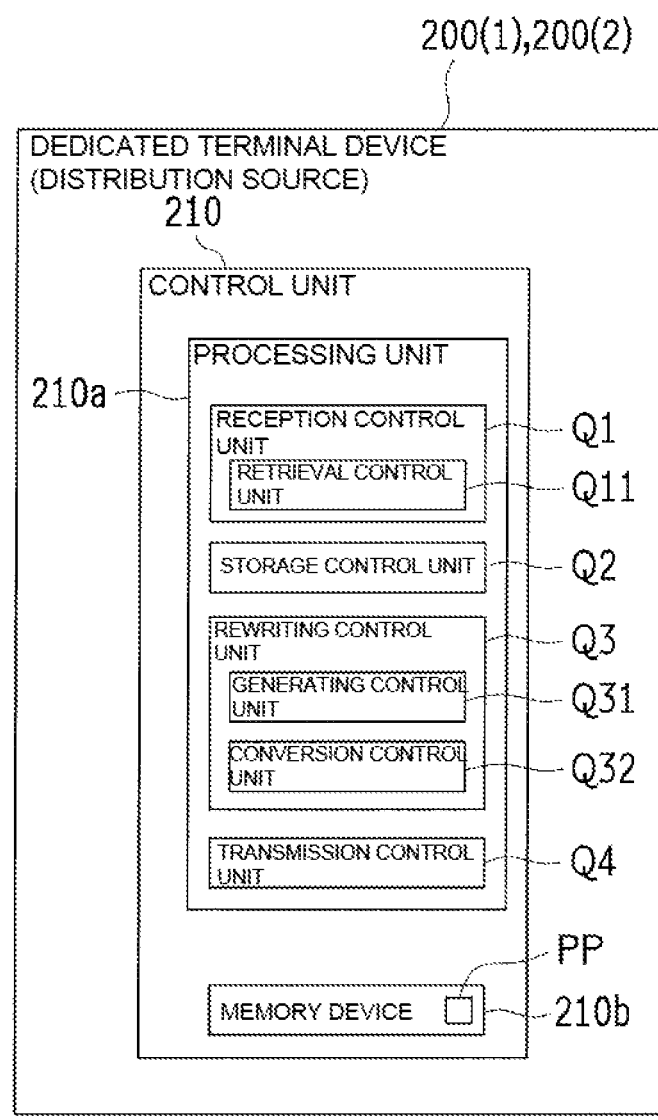
FIG. 9 is a block diagram showing an exemplary software configuration of the dedicated terminal device (distribution source) shown in FIG. 1 to FIG. 3.

FIG. 9 is a block diagram showing an exemplary software configuration of the dedicated terminal device 200(1), 200(2) (distribution source) shown in FIG. 1 to FIG. 3.

As shown in FIG. 9, the control unit 210 includes: a reception control unit Q1, a storage control unit Q2, a rewriting control unit Q3, and a transmission control unit Q4. In other words, the software rewriting program PP causes the control unit 210 to execute steps including: a reception control step corresponding to the reception control unit Q1; a storage control step corresponding to the storage control unit Q2; a rewriting control step corresponding to the rewriting control unit Q3; and a transmission control step corresponding to the transmission control unit Q4.

(Reception Control Step)

In the reception control step, the control unit 210 receives, via the wide area network WN and the wide area communication unit 220, a piece of difference source code DSC in the updating software storing database DB3 from the server 130 having the updating software storing database DB3 storing pieces of difference source code DSC.

More specifically, the reception control unit Q1 includes a retrieval control unit Q11. In other words, the reception control step includes a retrieval control step corresponding to the retrieval control unit Q11.

In the retrieval control step, the control unit 210 retrieves a piece of difference source code DSC for a piece of source code SC corresponding to a current piece of object code OC, which is stored in the storage unit 230. In other words, the control unit 210 retrieves a piece of difference source code DSC, which is a difference between the latest piece of source code NSC for the latest version of object code NOC, and the current piece of source code SC stored in the storage unit 230.

The control unit 210 receives, via the wide area network WN and the wide area communication unit 220, the pieces of model information MI and pieces of difference source code DSC associated with the pieces of model information MI in the updating software database DB from the server 130. In the present embodiment, the control unit 210 receives, via the wide area network WN and the wide area communication unit 220, the pieces of model information MI and the pieces of difference source code DSC associated with the pieces of model information MI, from the server 130 having, in its storage unit 230, the model information management database DB1 storing pieces of model information MI of movable objects 110(1) to 110(n), the updating software management database DB2 storing updating software codes WFWC associated with the pieces of model information MI of the movable objects 110(1) to 110(n) along with control device codes CC, and the updating software storing database DB3 storing the pieces of difference source code DSC associated with the updating software codes WFWC.

More specifically, the control unit 210 receives, via the wide area network WN and the wide area communication unit 220, pieces of difference source code DSC and pieces of update information RI of the pieces of difference source code DSC from the updating software database DB of the server 130. In the present embodiment, the control unit 210 receives, via the wide area network WN and the wide area communication unit 220, the updating software codes WFWC and the pieces of update information RI of the updating software codes WFWC from the server 130.

(Storage Control Step)

In the storage control step, the control unit 210 stores, in the storage unit 230, the pieces of difference source code DSC received from the server 130.

Specifically, the control unit 210 stores, in the storage unit 230, the pieces of model information MI and pieces of difference source code DSC associated with the pieces of model information MI which are received from the server 130. In the present embodiment, the control unit 210 stores the pieces of model information MI received from the server 130 in the model information management database DB1 of the storage unit 230, stores the updating software codes WFWC received from the server 130 along with the control device codes CC in association with the pieces of model information MI in the updating software management database DB2 of the storage unit 230, and stores the pieces of difference source code DSC received from the server 130 in association with the updating software codes WFWC in the updating software storing database DB3 of the storage unit 230.

More specifically, the control unit 210 stores, in the storage unit 230, the pieces of difference source code DSC and the pieces of update information RI of the updating software packages WFW received from the server 130. In the present embodiment, the control unit 210 stores the updating software codes WFWC and the pieces of update information RI of the updating software codes WFWC having received from the server 130, in the updating software management database DB2. Further, the control unit 210 stores the updating software codes WFWC and the pieces of difference source code DSC associated with the updating software codes WFWC having received from the server 130 in the updating software storing database DB3.

(Rewriting Control Step)

The terminal devices 200(1) and 200(2) (distribution sources) are provided to the movable objects 110(1) and 110(2), respectively.

The rewriting control unit Q3 includes a generating control unit Q31 and a conversion control unit Q32 (so-called compiler or assembler). In other words, the rewriting control step includes a generating control step corresponding to the generating control unit Q31 and a conversion control step corresponding to the conversion control unit Q32.

In the generating control step, the control unit 210 generates a latest piece of source code NSC based on the piece of difference source code DSC retrieved in the retrieval control step, and a current piece of source code SC corresponding to the piece of difference source code DSC, out of the current pieces of source code SC to SC stored in the storage units 230.

In the conversion control step, the control unit 210 converts the latest piece of source code NSC generated in the generating control step into a latest piece of object code NOC.

Specifically, in the rewriting control step, the control unit 210 specifies a piece of difference source code DSC corresponding to a piece of model information MI of a movable object 110(i) on the other end, out of the pieces of difference source code DSC stored in the storage units 230. The control unit 210 then generates a latest piece of source code NSC for the control device [113(1) to 113(m)] mounted in the movable object 110(i) on the other end, based on the piece of difference source code DSC and a current piece of source code SC of the movable object 110(i) on the other end, which is stored in the storage units 230 (generating control step). Then, the latest piece of source code NSC generated is converted (compiled, or assembled) into a latest piece of object code NOC (conversion control step). In the later-described transmission control step, the control unit 210 transmits the latest piece of object code NOC generated to the control device [113(1) to 113(m)] mounted in the movable object 110(i) on the other end. Then, the terminal device (i) or the control device [113(1) to 113(m)] in the movable object 110(i) on the other end on the other end rewrite(s) the software package FW with the latest piece of object code NOC.

Further, in the rewriting control step, the control unit 210 specifies a piece of difference source code DSC corresponding to a piece of model information MI of the own movable object [110(1), 110(2)], out of the pieces of difference source code DSC stored in the storage units 230. The control unit 210 then generates a latest piece of source code NSC for the control device [113(1) to 113(m)] mounted in the own movable object [110(1), 110(2)], based on the piece of difference source code DSC and a current piece of source code SC of the own movable object [110(1), 110(2)], which is stored in the storage units 230 (generating control step). Then, the latest piece of source code NSC generated is converted (compiled, or assembled) into the latest piece of object code NOC (conversion control step). In the later-described transmission control step, the control unit 210 transmits the latest piece of object code NOC generated to the control device [113(1) to 113(m)] mounted in the own movable object [110(1), 110(2)]. Then, the terminal device (i) or the control device [113(1) to 113(m)] in the own movable object [110(1), 110(2)] rewrite(s) the software package FW with the latest piece of object code NOC.

It should be noted that the dedicated terminal device 200(2) (distribution source) may receive the latest piece of object code NOC from the terminal device 200(1), or may receive pieces of source code SC to SC for the control device [113(1) to 113(m)] and a piece of difference source code, because the terminal device 200(2) itself has the generating control unit Q31 and the conversion control unit Q32. Similarly, the dedicated terminal device 200(1) (distribution source) may receive the latest piece of object code NOC from the terminal device 200(2), or may receive piece of source code SC to SC for the control device [113(1) to 113(m)] and a piece of difference source code, because the terminal device 200(1) itself has the generating control unit Q31 and the conversion control unit Q32.

(Transmission Control Step)

In the transmission control step, the control unit 210 transmits the latest piece of object code NOC obtained by converting the piece of difference source code DSC to another movable object 110(i) via the short-range wireless communication unit 240 and the short-range wireless communication network LN, and/or transmits the same to the control device [113(1) to 113(m)] of the own movable object [110(1), 110(2)].

In the transmission control step, the control unit 210 transmits a piece of difference source code DSC stored in the storage unit 230 to another movable object [110(2), 110(1)] (distribution source) via the short-range wireless communication unit 240 and the short-range wireless communication network LN.

Specifically, the control unit 210 specifies, from the pieces of model information MI stored in its storage unit 230, the piece of model information MI of a movable object 110(i) on the other end, and transmits a piece of difference source code DSC corresponding to the piece of model information MI of the movable object 110(i) on the other end, out of the pieces of difference source code DSC to DSC stored in the storage unit 230, or the latest piece of object code NOC obtained by converting the piece of difference source code DSC to the movable object 110(i) on the other end, via the short-range wireless communication unit 240 and the short-range wireless communication network LN. In the present embodiment, the control unit 210 specifies a piece of model information MI of the movable object 110(i) on the other end from the pieces of model information MI stored in the model information management database DB1. At this time, the control unit 210 is in a communication state with the movable object 110(i) on the other end, and has acquired the piece of model information MI of the destination mobile unit 110(i). Further, the control unit 210 specifies an updating software code WFWC corresponding to the specified piece of model information MI of the movable object 110(i) on the other end, from the updating software codes WFWC stored in the updating software management database DB2. Then, the control unit 210 transmits, to the movable object 110(i) on the other end via the short-range wireless communication units 240 and the short-range wireless communication network LN, the piece of difference source code DSC corresponding to the specified updating software code WFWC out of the pieces of difference source code DSC stored in the updating software storing database DB3.

Prior to transmission of the piece of difference source code DSC to the movable objects 110(i) on the other end, the control unit 210 may transmit a piece of update information RI of the piece of difference source code DSC stored in the storage unit 230 to the movable object 110(i) on the end, via the short-range wireless communication units 240 and the short-range wireless communication network LN.

This way, in a movable object 110(i) on the other end, the piece of update information RI such as the version VR and the like of the software package FW of the control device [113(1) to 113(m)] before rewriting can be compared with the piece of update information RI such as the version VR and the like of the updating software package WFW. Then, whether or not the software package FW of the control device [113(1) to 113(m)] before rewriting is the latest package may be determined. If the package is determined as not to be the latest one, the piece of difference source code DSC may be requested to the terminal device 200(1) (distribution source) or the terminal device 200(2) (distribution source), whereas if the package is determined as to be the latest one, the piece of difference source code DSC is not requested to the terminal device 200(1) (distribution source) or the terminal device 200(2) (distribution source). Thus, whether or not the software package FW for the control device [113(1) to 113(m)] is the latest package can be recognized in the movable object 110(i) on the other end, before transmission of the piece of difference source code DSC to the movable object 110(i) on the other end. Hence, unnecessary transmission operation of the piece of difference source code DSC to a movable object 110(i) on the other end can be omitted.

Further, prior to transmission of the piece of difference source code DSC to the movable object 110(i) on the other end, the control unit 210 may receive, from the movable object 110(i) on the other end, the piece of update information RI of the software package FW for the control device [113(1) to 113(m)] in the movable object 110(i) on the other end before rewriting. Then, the control unit 210 can compare the received piece of update information RI such as the version VR and the like of the software package FW with the piece of update information RI such as the version VR and the like of the piece of difference source code DSC stored in the storage unit 230, and determine whether or not the software package FW of the control device [113(1) to 113(m)] before rewriting is the latest package. If the package is determined as not to be the latest one, the piece of difference source code DSC may be transmitted to the movable object 110(i) on the other end, whereas if the package is determined as to be the latest, the piece of difference source code DSC may not be transmitted to the movable object 110(i) on the other end.

Thus, whether or not the software package FW for the control device [113(1) to 113(m)] is the latest package can be recognized in the terminal device 200(1) (distribution source) or the terminal device 200(2) (distribution source), before transmission of the updating software package WFW to the movable object 110(i) on the other end. Hence, unnecessary transmission operation of the piece of difference source code DSC to movable objects 110(i) on the other end can be omitted.

Storing pieces of difference source code DSC associated with pieces of model information MI for movable objects 110(1) to 110(n) of all types, and for movable objects 110(1) to 110(n) of all models in the storage unit 230, increases the data volume, consequently leading to increases in the storage volume of the storage unit 230 and the communication time.

In view of this, the updating software database DB stores pieces of area information AR (see FIG. 10 and FIG. 11 described later) indicative of control areas of the movable objects 110(1) to 110(n) in association with terminal identification information ID (see FIG. 11) of each of the terminal devices 200(1) and 200(2) (distribution source). The terminal identification information ID of the terminal devices 200(1) to 200(n) may be, for example, serial numbers and phone numbers; however, is not limited to these provided that the terminal devices 200(1) to 200(n) are uniquely distinguishable.

FIG. 10 is a schematic view showing an exemplary data structure with pieces of area information AR added in the model information management database DB1 shown in FIG. 4. FIG. 11 is a schematic view showing an exemplary data structure of the area information management database DB4 constituting the updating software database DB in the storage unit 133 provided to the server 130.

The updating software database DB stores pieces of area information AR indicative of control areas of the movable objects 110(1) to 110(n) in association with terminal identification information ID of each of the terminal devices 200(1) and 200(2) (distribution source).

In the present embodiment, the updating software database DB further includes the area information management database DB4. Further, the pieces of area information AR are added in the model information management database DB1 shown in FIG. 4.

In the area information management database DB4, the terminal identification information ID (distribution source) of the terminal device 200(1), 200(2), the piece of area information AR, the terminal identification information RID of terminal devices [200(2) to 200(n)], [200(1) and 200(3) to 200(n)] registered for the terminal device 200(1), 200(2) (distribution source), and the model codes MC.

It should be noted that, the updated/not-updated field RVR for each of the terminal devices 200(1) to 200(n) of the movable objects 110(1) to 110(n), in the area information management database DB4, indicates "not-updated" (specifically, "0" as the value of the flag) if the corresponding software package FW of the control devices 113(1) to 113(m) is not yet updated to the latest version. When the corresponding software package FW is updated to the latest version, the server 130 receives, from a terminal device 200(i) in which updating took place, information indicating that the software package FW is updated. Then, for the terminal device 200(i) of the movable object 110(i) in which the software package FW is updated, the updated/not-updated field RVR of the associated model code MC is switched to "updated" (specifically, the value of the flag is switched to "1").

It should be noted that, when all the updated/not-updated fields RVR of a model code MC (e.g., WRK1) in the area information management database DB4 indicate "updated", the server 130 and/or the terminal device 200(1), 200(2) (distribution source) may delete the piece of difference source code DSC in the updating software storing database DB3, the piece of difference source code DSC corresponding to that model code MC (e.g., WRK1) with all the associated updated/not-updated fields RVR switched to "updated".

When a new version of the software package FW is developed, the corresponding updated/not-updated fields RVR are switched to "not-updated" (i.e., reset; specifically, the flag is set to "0") at any time in the area information management database DB4.

In the reception control step, the control unit 210 receives, from the server 130 via the wide area network WN and the wide area communication unit 220, the piece of model information MI and the piece of difference source code DSC associated with the piece of model information MI, the piece of model information MI corresponding to the piece of area information AR associated with the terminal identification information ID of the terminal device 200(1) or 200(2) (distribution source), in the updating software database DB. In the present embodiment, the control unit 210 receives, from the server 130 via the wide area network WN and the wide area communication unit 220, the piece of model information MI and the piece of difference source code DSC associated with the piece of model information MI, the piece of model information MI corresponding to the piece of area information AR associated with the terminal identification information ID of the terminal device 200(1) or 200(2) (distribution source).

In the storage control step, the control unit 210 stores, in the storage unit 230, a piece of model information MI of a piece of area information AR thereof and a piece of difference source code DSC associated with the piece of model information MI which are received from the server 130. In the present embodiment, the control unit 210 stores, in the model information management database DB1 (see FIG. 10) in its storage unit 230, the piece of model information MI of the piece of area information AR associated with the terminal identification information ID of the terminal device 200(1), 200(2) (distribution source) which is received from the server 130. The control unit 210 stores the updating software codes WFWC received from the server 130 along with the control device codes CC in association with the piece of model information MI in the updating software management database DB2 (see FIG. 5) of its storage unit 230. Further, the control unit 210 stores the pieces of difference source code DSC received from the server 130 in association with the updating software codes WFWC in the updating software storing database DB3 (see FIG. 6) of its storage unit 230. With this configuration the control unit 210 is able to selectively store updating software packages WFW related to models having the same piece of area information AR as itself

[Dedicated Terminal Device (Non-Distribution Source)]

As shown in FIG. 3, the terminal devices 200(3) to 200(n) (non-distribution sources) each has a piece of difference source code DSC which does not have pieces of model information MI of other movable objects 110(*i*) in the terminal devices 200(1) and 200(2) (distribution source). Specifically, although the terminal devices 200(3) to 200(*n*) (non-distribution sources) each has an updating software management database DB2 and an updating software storing database DB3 storing a piece of difference source code DSC which does not have the pieces of model information MI of the other movable objects 110(*i*); however, does not have a model information management database DB1 and an area information management database DB4.

Second Embodiment

Figure 12:
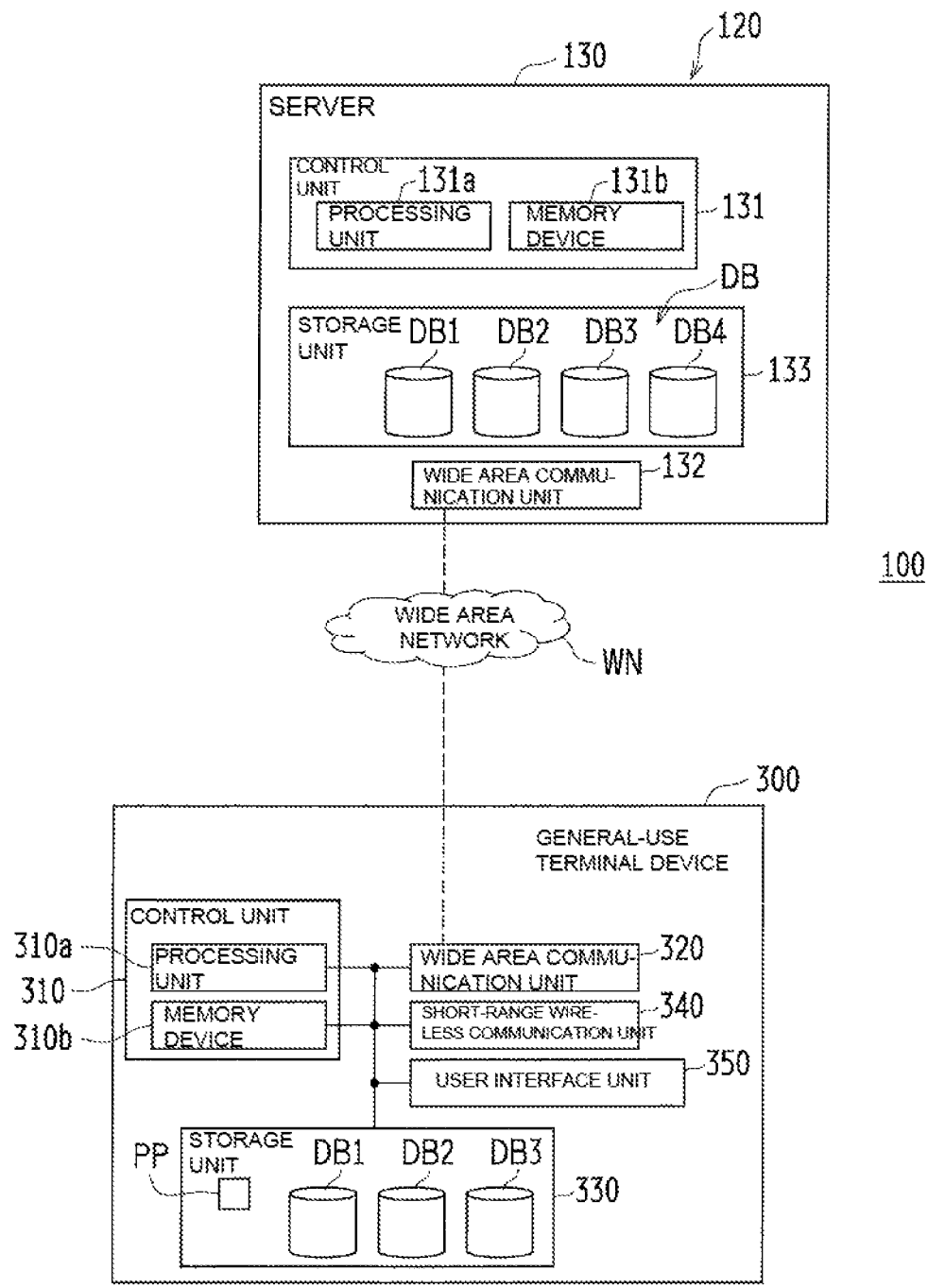
FIG. 12 is a structural diagram schematically showing an example software rewriting system related to a second embodiment, and provides a schematic view of a state where a general-use terminal device is communicating with a server via a wide area network.
Figure 13:
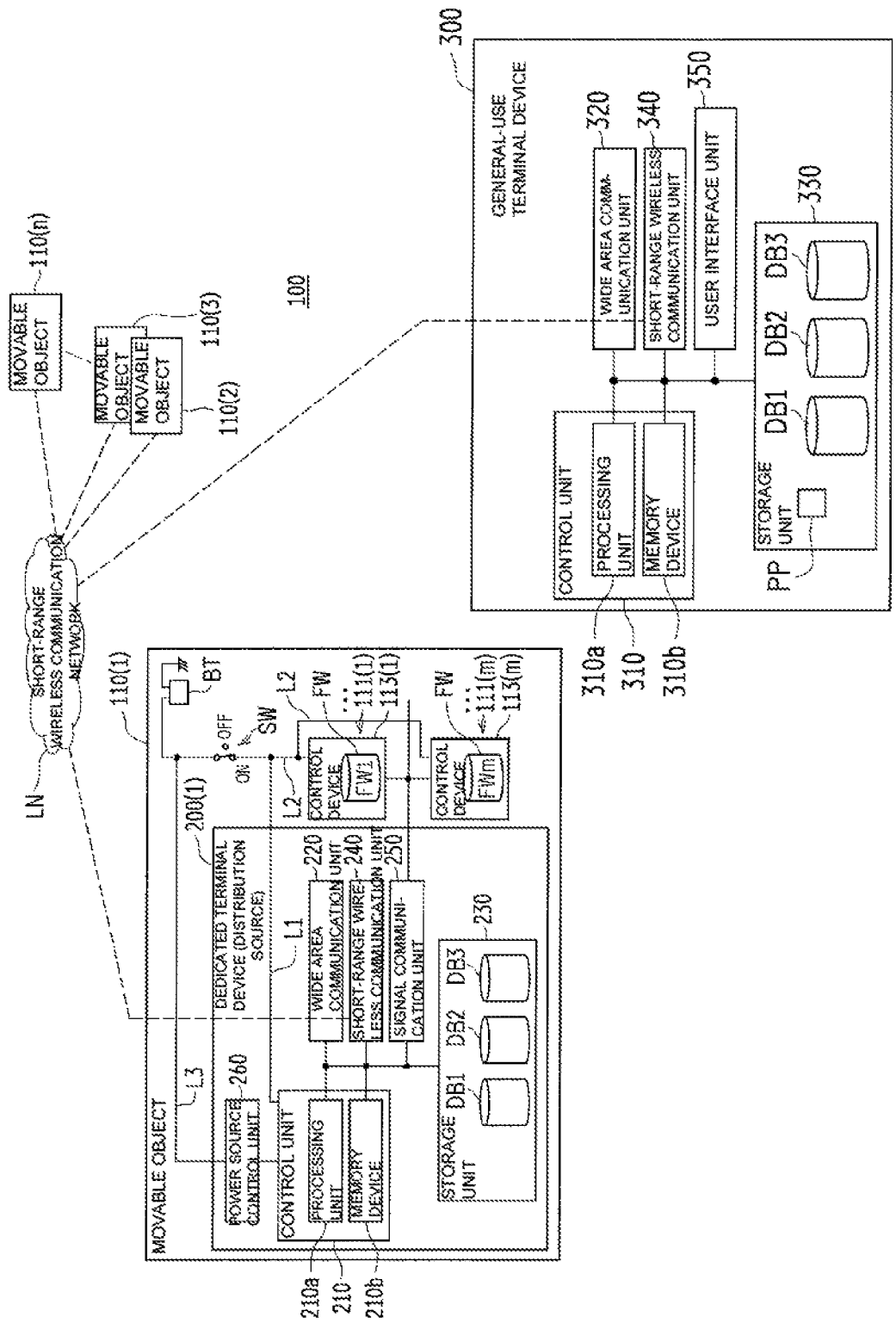
FIG. 13 is a schematic view showing a state where the general-use terminal device having communicated with the server is communicating, via a short-range wireless communication network, with a dedicated terminal device that could serve as a distribution source, in the software rewriting system shown in FIG. 12.
Figure 14:
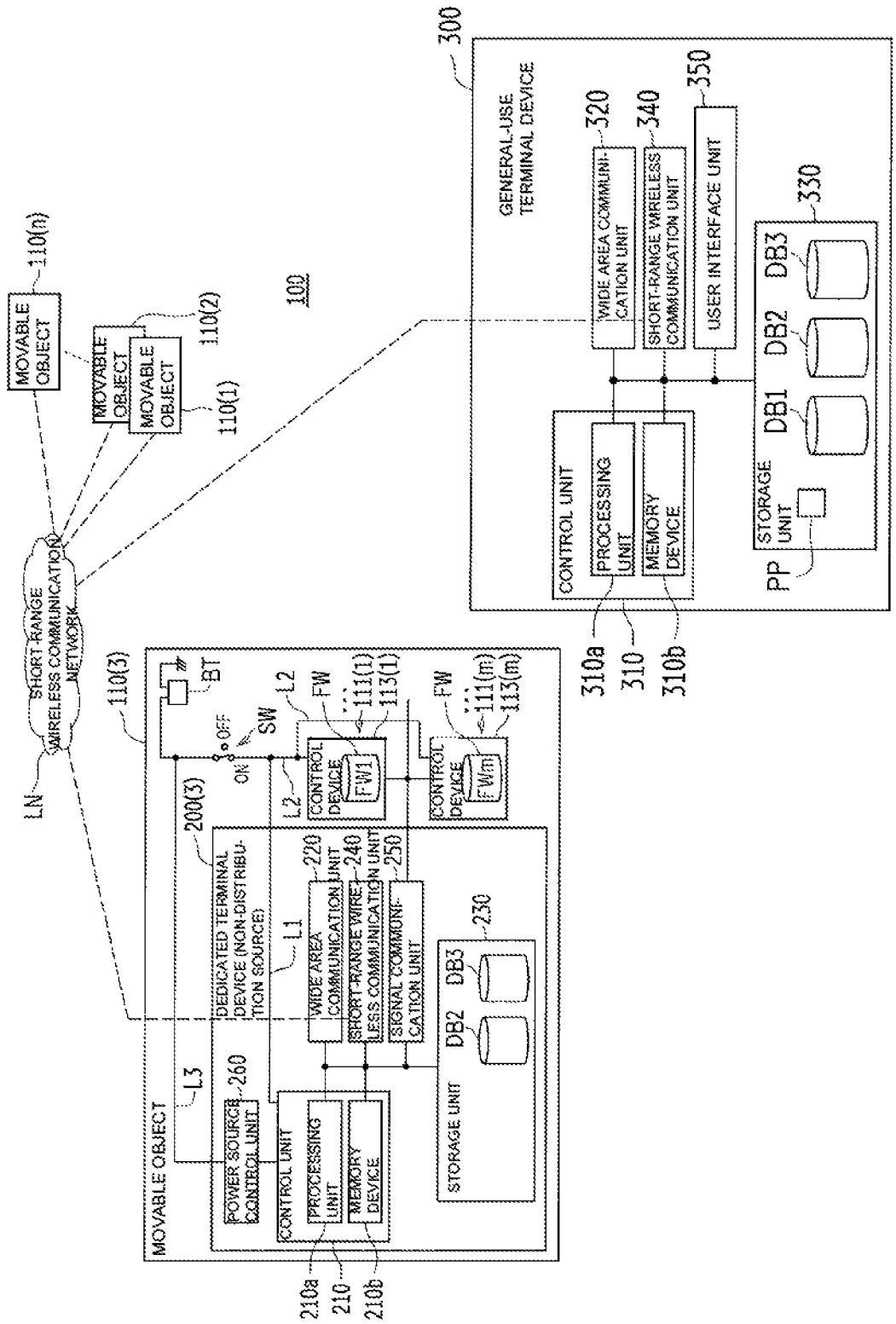
FIG. 14 is a schematic view showing a state where the general-use terminal device having communicated with the server is communicating, via a short-range wireless communication network, with a dedicated terminal device that does not substantially serve as a distribution source, in the software rewriting system shown in FIG. 12.

FIG. 12 to FIG. 14 are structural view schematically showing an exemplary software rewriting system 100 related to a second embodiment.

FIG. 12 is a schematic view of a state where a general-use terminal device 300 is communicating with the server 130 via a wide area network WN. FIG. 13 is a schematic view showing a state where the general-use terminal device 300 having communicated with the server 130 is communicating, via a short-range wireless communication network LN, with a dedicated terminal device 200(1) that could serve as a distribution source, in the software rewriting system 100 shown in FIG. 12. FIG. 14 is a schematic view showing a state where the general-use terminal device 300 having communicated with the server 130 is communicating, via a short-range wireless communication network LN, with a dedicated terminal device 200(3) that does not substantially serve as a distribution source, in the software rewriting system 100 shown in FIG. 12.

The software rewriting system 100 related to the second embodiment includes a general-use terminal device 300 in the software rewriting system 100 related to the first embodiment.

Next, a system configuration of the general-use terminal device (300) is described with reference to FIG. 12 to FIG. 14.

[General-Use Terminal Device]

Hardware Configuration of General-Use Terminal Device

As shown in FIG. 12 to FIG. 14, the terminal device 300 includes a control unit 310 (an example of computer), a wide area communication unit 320, a storage unit 330, a short-range wireless communication unit 340, and a user interface unit 350. It should be noted that a plurality of terminal devices 300 may be provided.

Here, the general-use terminal device 300 is, for example, a multi-function portable communication terminal device such as a tablet computer, a smartphone, and the like. The terminal identification information ID of the terminal devices 200(1) to 200(*n*) may be, for example, serial numbers, the International Mobile Equipment Identifier (IMEI) numbers, and phone numbers; however, is not limited to these provided that the terminal devices 200(1) to 200(*n*) are uniquely distinguishable.

(Control Unit)

The control unit 310 includes: a processing unit 310*a* constituted by a so-called computer such as a CPU (Central Processing Unit); and a memory unit 310*b* including a volatile memory such as a ROM (Random Only Memory), a RAM (Random Access Memory).

The control unit 310 is configured to achieve various functions necessary for the control unit 310, by running programs such as software rewriting program PP which is stored (installed) in advance in the storage unit 330. Specifically, the control unit 310 is configured to perform various processes by having a processing unit 310*a* thereof load a program such as the software rewriting program PP stored in advance in the storage unit 330 into the RAM of the memory device 310*b*, and running that program. The RAM of the memory device 310*b* provides a working area to the control unit 310.

In the present embodiment, the control unit 310 controls transmission/reception of data during communications, various inputs and outputs, and arithmetic processing.

(Wide Area Communication Unit)

The wide area communication unit 320 is electrically connected to a data line of the control unit 310. With instructions from the control unit 310, the wide area communication unit 320 is able to perform communication using the same communication protocol as the wide area communication unit 132 (see FIG. 12) of the server 130. Data transmitted/received during communication is converted by the wide area communication unit 320 so as to comply with the communication protocol. Further, the wide area communication unit 320 receives, from the server 130, information regarding software packages FW of the control devices 113(1) to 113(*m*) in the movable objects 110(1) to 110(*n*), which information is stored in the storage unit 133 of the server 130.

(Storage Unit)

The storage unit 330 is electrically connected to a data line of the control unit 310. With instructions from the control unit 310, the storage unit 330 controls writing and reading of information. The storage unit 330, in this example, is a large-capacity storage unit such as a flush memory. It should be noted that, the software rewriting program PP is stored (installed) in advance in the storage unit 330.

It should be noted that, the software rewriting program PP, in this example, is a program so-called an app used in a multi-function portable communication terminal device such as a tablet computer and a smartphone, and is downloaded from a not-shown program server via communication means such as the internet.

The storage unit 330 stores therein a model information management database DB1, an updating software management database DB2, and an updating software storing database DB3.

The data structures of the model information management database DB1, the updating software management database DB2, and the updating software storing database DB3 are similar to those of the model information management database DB1, the updating software management database DB2, and the updating software storing database DB3 stored in the storage unit 133 of the server 130 as shown in FIG. 4 to FIG. 6. Therefore, descriptions of them are omitted here.

(Short-Range Wireless Communication Unit)

The short-range wireless communication unit 340 in the terminal device 300 performs short-range wireless communication with short-range wireless communication units 240 of the terminal devices 200(1) to 200(*n*).

(User Interface Unit)

The user interface unit 350 includes an output device such as a display device and an input device such as touch panel. Typically, the user interface unit 350 is capable of activating and controlling the software rewriting program PP, and displaying progress information and the like.

Software Configuration of General-Use Terminal Device

Figure 15:
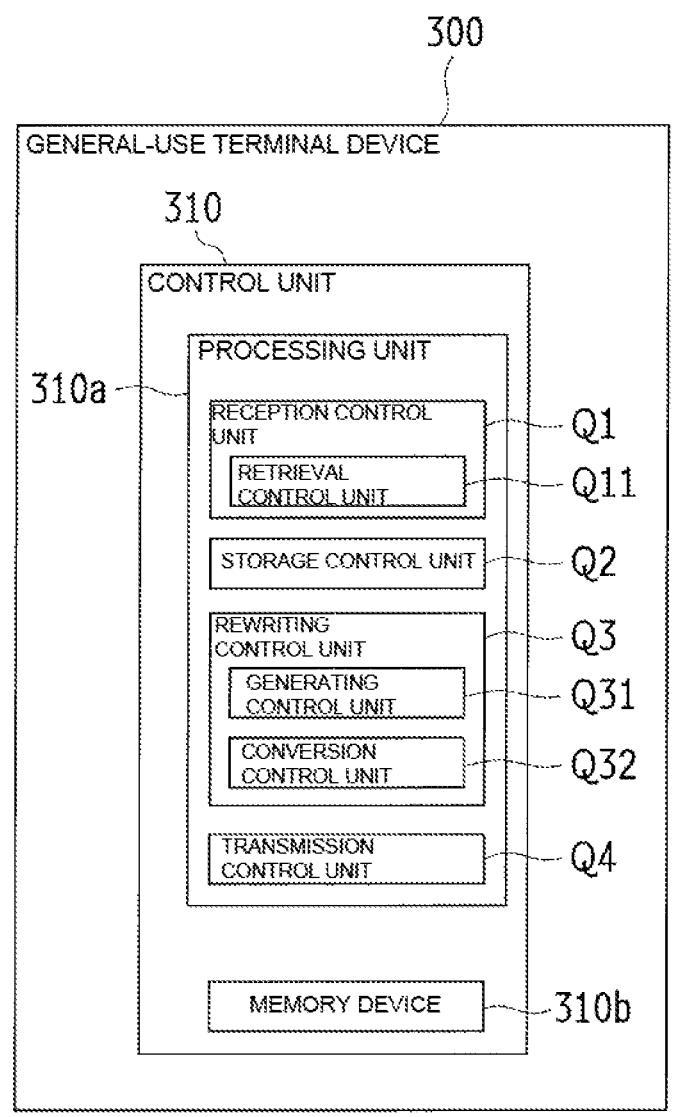
FIG. 15 is a block diagram showing an exemplary software configuration of the general-use terminal device shown in FIG. 12 to FIG. 14.

FIG. 15 is a block diagram showing an exemplary software configuration of the general-use terminal device 300 shown in FIG. 12 to FIG. 14.

As shown in FIG. 15, the control unit 310 includes: a reception control unit Q1, a storage control unit Q2, a rewriting control unit Q3, and a transmission control unit Q4. In other words, the software rewriting program PP causes the control unit 310 to execute steps including: a reception control step corresponding to the reception control unit Q1; a storage control step corresponding to the storage control unit Q2; a rewriting control step corresponding to the rewriting control unit Q3; and a transmission control step corresponding to the transmission control unit Q4.

In the transmission control step, the control unit 310 transmits the latest piece of object code NOC to the movable objects 110(1) to 110(n) via the short-range wireless communication unit 340 and the short-range wireless communication network LN, irrespective of the presence/absence of the generating control unit Q31 and the conversion control unit Q32.

In the transmission control step, the control unit 310 transmits a piece of difference source code DSC to a movable object [110(1), 110(2)] having the generating control unit Q31 and the conversion control unit Q32, via the short-range wireless communication unit 340 and the short-range wireless communication network LN.

It should be noted that the reception control step and the storage control step performed by the control unit 310 are similar to the reception control step and the storage control step performed by the control unit 210 of each of the above-described dedicated terminal devices 200(1) and 200 (2). Therefore, descriptions for these steps are omitted.

Further, the configuration of the software rewriting system 100 related to the first embodiment may be combined with the configuration of the software rewriting system 100 related to the second embodiment.

[Software Rewriting Process in the Software Rewriting System]

Next, the following describes, with reference to FIG. 16 to FIG. 20, an exemplary software rewriting process in the software rewriting system 100.

Figure 16:
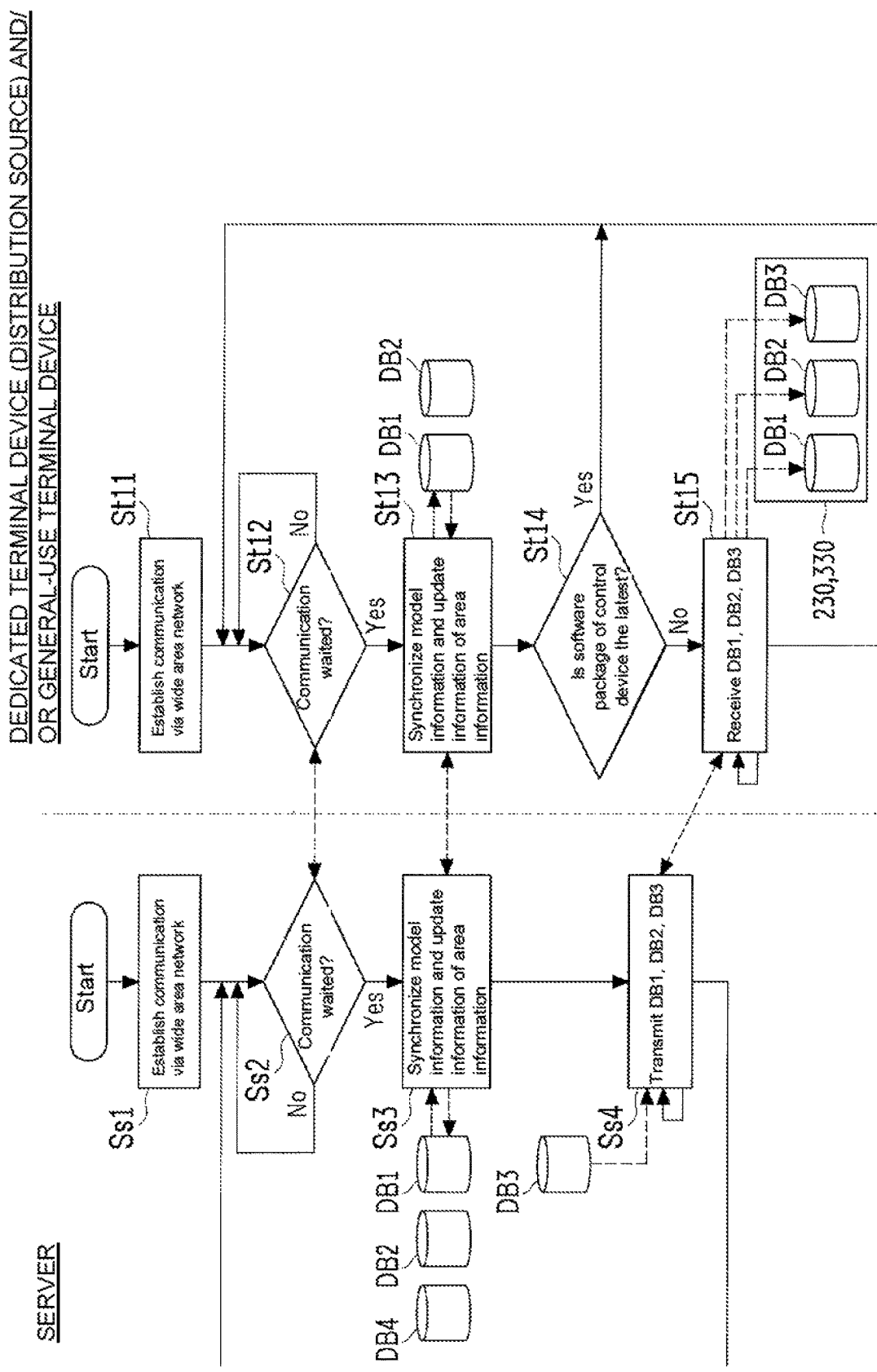
FIG. 16 is a flowchart showing an example (an example of download process) where a dedicated terminal device (distribution sources) and/or a general-use terminal device is/are communicating with a server via a wide area network.
Figure 17:
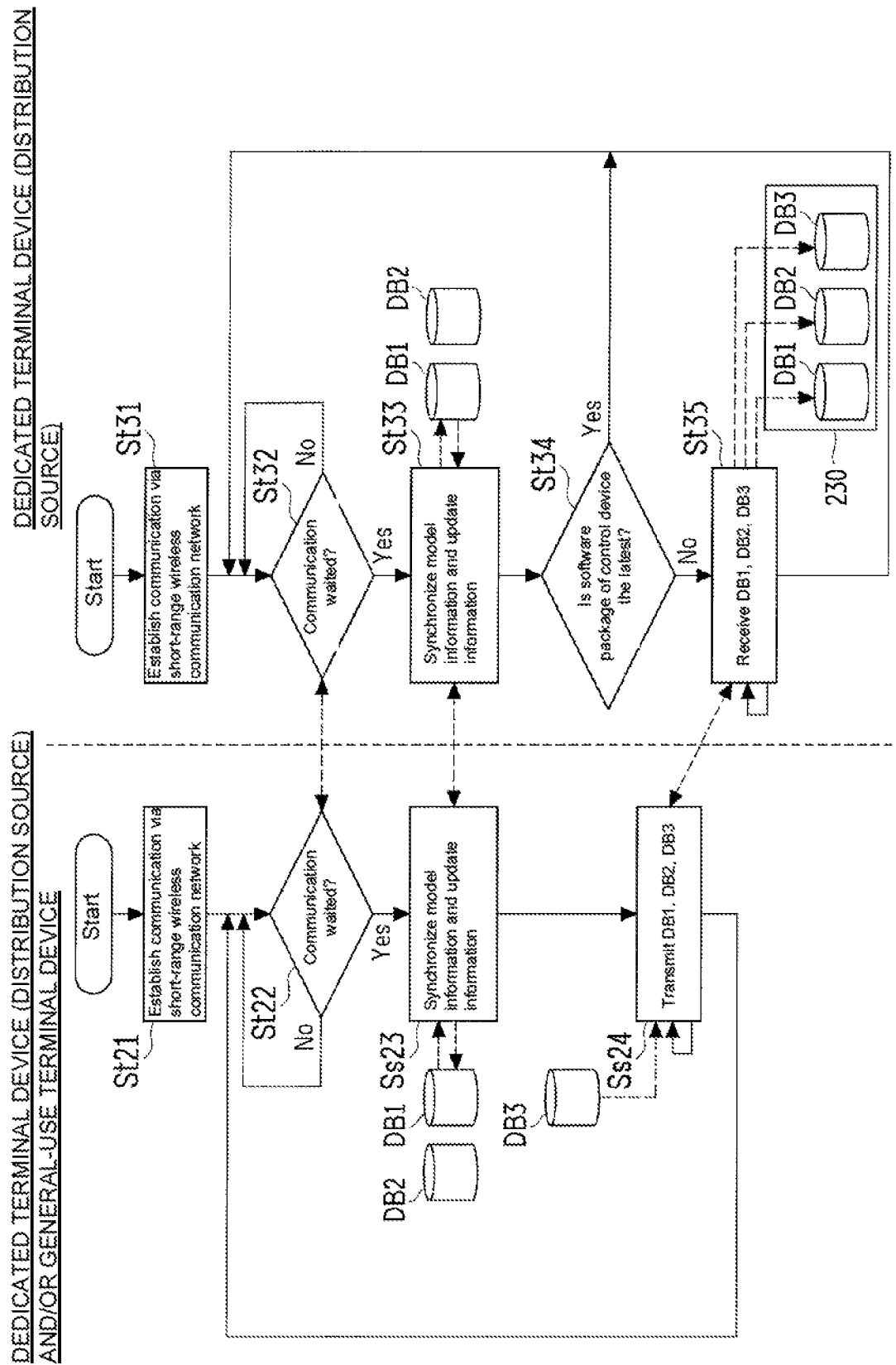
FIG. 17 is a flowchart showing an example (an example of distribution process) where a dedicated terminal device (distribution sources) and/or a general-use terminal device having communicated with the server is/are communicating with another dedicated terminal device via a short-range wireless communication network.
Figure 18:
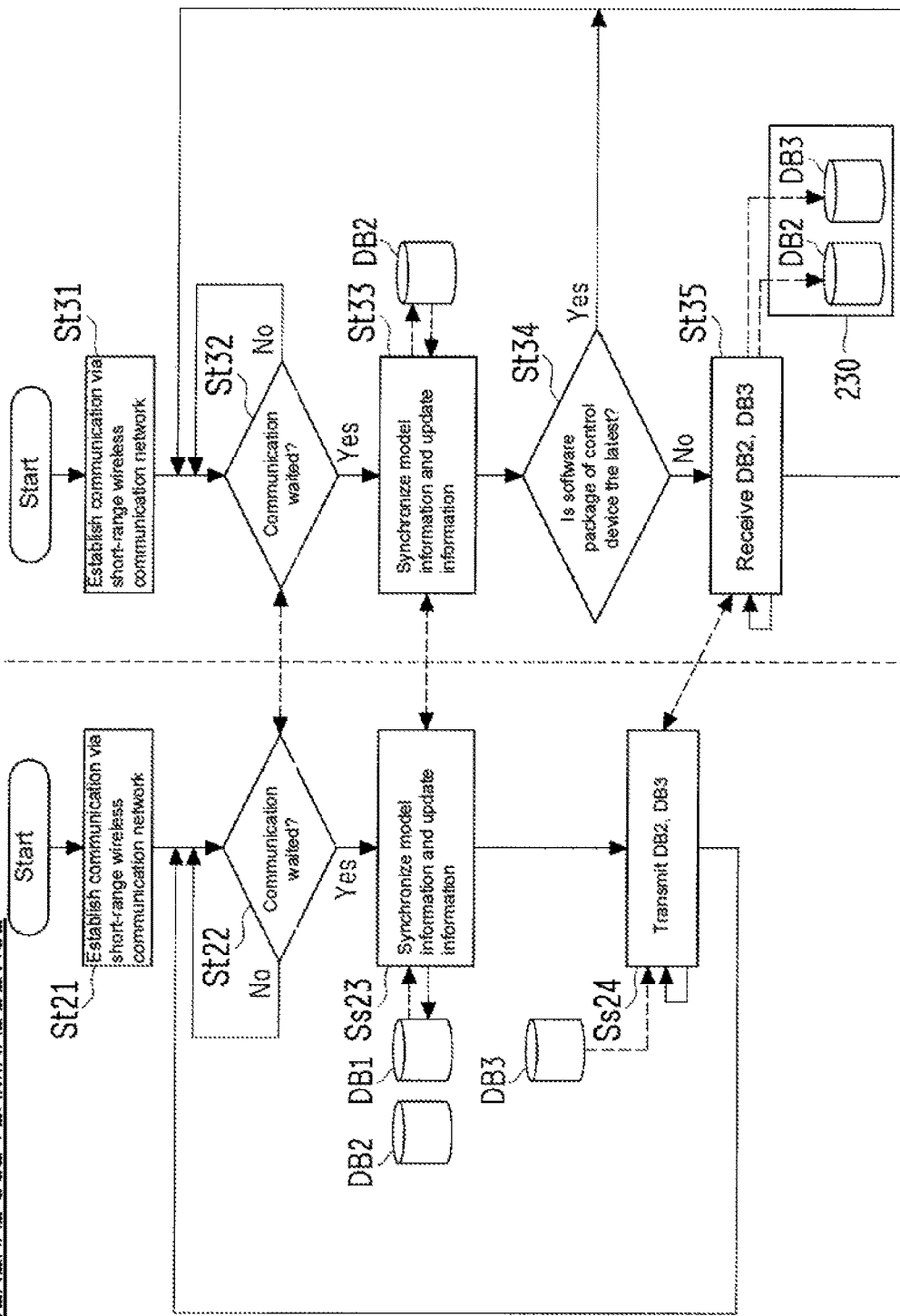
FIG. 18 is a flowchart showing an example (another example of distribution process) where a dedicated terminal device (non-distribution sources) and/or a general-use terminal device having communicated with the server is/are communicating with another dedicated terminal device via a short-range wireless communication network.

FIG. 16 is a flowchart showing an example (an example of download process) where a dedicated terminal device 200(1), 200(2) (distribution source) and/or a general-use terminal device 300 is/are communicating with a server 130 via a wide area network WN. FIG. 17 is a flowchart showing an example (an example of distribution process) where a dedicated terminal device 200(1), 200(2) (distribution source) and/or a general-use terminal device 300 having communicated with the server 130 is/are communicating with the dedicated terminal device 200(2), 200(1) (distribution source) via a short-range wireless communication network LN. FIG. 18 is a flowchart showing an example (another example of distribution process) where a dedicated terminal device 200(1), 200(2) (distribution source) and/or a general-use terminal device 300 having communicated with a server 130 is/are communicating with another dedicated terminal device 200(3) to 200(n) (non-distribution source) via a short-range wireless communication network LN.

It should be noted that, the exemplary processes shown in FIG. 16 and FIG. 17 adopts a model information management database DB1 (see FIG. 11) which additionally has the pieces of area information AR associated with terminal identification information ID of each of the terminal devices 200(1) and 200(2) (distribution sources) in the area information management database DB4 (see FIG. 10).

Exemplary Download Process Shown in FIG. 16

In the flowchart of the software rewriting process shown in FIG. 16, first, the control unit 131 in the server 130 causes the wide area communication unit 132 to establish communications with the dedicated terminal device 200(1), 200(2) (distribution source) and/or the general-use terminal device 300 (hereinafter, these terminal devices may be simply referred to as terminal device [200, 300]) (Step Ss1), via a wide area network WN. Then, communication from the terminal device [200, 300] is waited (step Ss2), and stays in the standby state until a response from the terminal device [200, 300] is received (Step Ss2).

Meanwhile, the control unit [210, 310] in the terminal device [200, 300] causes its wide area communication unit [220, 320] to establish communication with the server 130 via the wide area network WN in an area with sufficiently developed communication infrastructure (Step St11). Then, communication from the server 130 is waited (St12), and stays in the standby state until a response from the server 130 is received (Step St12: No).

Next, when a response is received from the terminal device [200, 300] (Step Ss2: Yes), the control unit 131 of the server 130 synchronizes, with the terminal device [200, 300], the piece of model information MI and the piece of update information RI of an updating software package WFW of a movable object 110 corresponding to the piece of area information AR which is associated with the terminal identification information ID of the terminal device [200, 300] (Step Ss3). Then, the control unit 131 transmits information containing the updating software package WFW to the terminal device [200, 300] (Step Ss4).

Specifically, the control unit 131 in the server 130 receives the terminal identification information ID of the terminal device 200, 300. Then, from the storage unit 133, the control unit 131 retrieves a piece of model information MI corresponding to the piece of area information AR associated with the terminal identification information ID of the terminal device 200, 300 and an updating software package WFW associated with the piece of model information MI. These pieces of information are then transmitted to the terminal device 200, 300 via the wide area network WN and the wide area communication unit 220, 320. In the above, for example, where the terminal identification information ID is #7777, the area information is A4 (see FIG. 11). Where the area information is A4, the model code is BT1, . . . (see FIG. 10). Further, where the model code is BT1, . . . , the updating software code WFW is BT1ECU1FW1 (see FIG. 5), and the piece of difference source code is BT1ECU1FW10_11.TXT, . . . (see FIG. 6).

In other words, the control unit 131 in the server 130 transmits the model information management database DB1, the updating software management database DB2, and the updating software storing database DB3, each storing data corresponding to the piece of area information AR, to the terminal device [200, 300] via the wide area network WN and the wide area communication unit [220, 320].

Meanwhile, when a response from the server 130 is received (Step St12: Yes), the control unit [210, 310] in the terminal device [200, 300] synchronizes, with the server 130, the pieces of model information MI and the pieces of update information RI of updating software packages WFW of movable objects 110 corresponding to the piece of area information AR associated with the terminal identification information ID of the terminal device [200, 300] (Step St13). Then, for each of the movable objects 110, if the software package FW for the control device [113(1) to 113(m)] is not the latest package (e.g., not the latest version, or not with the latest date and time) (Step St14), the control unit [210, 310] receives the updating software package WFW (Step St15), and stores the received information in the storage unit 230, 330.

Specifically, the control unit 210, 310 in the terminal device 200, 300 receives the piece of model information MI corresponding to the piece of area information AR associated with the terminal identification information ID of the terminal device 200, 300 and updating software package WFW associated with the piece of model information MI, from the server 130 via the wide area network WN and the wide area communication unit 220, 320. The pieces of information received are then stored in the storage unit 230, 330. In the above, for example, where the terminal identification information ID is #7777, the area information is A4 (see FIG. 11). Where the area information is A4, the model code is BT1, . . . (see FIG. 10). Further, where the model code is BT1, . . . , the updating software code is BT1ECU1FW1 (see FIG. 5) and the piece of difference source code is BT1ECU1FW10_11.TXT, . . . (see FIG. 6).

In other words, the control unit [210, 310] in the terminal device [200, 300] receives (downloads) the model information management database DB1, the updating software management database DB2, and the updating software storing database DB3 each storing data corresponding to the piece of area information AR, from the server 130 via the wide area network WN and the wide area communication unit [220, 320]. The received pieces of information is then stored in the storage unit 230, 330.

Then, in the terminal device [200(1), 200(2)] of the movable object [110(1), 110(2)] which is the download destination, if the software package FW for the control device [113(1) to 113(m)] is not the latest package (e.g., not the latest version, or not with the latest date and time), the control unit 210 or its control device [113(1) to 113(m)] rewrites the software package FW for the control device [113(1) to 113(m)] based on the updating software package WFW.

Exemplary Distribution Process Shown in FIG. 17 and FIG. 18

FIG. 17 and FIG. 18 are each a flowchart showing a software rewriting process. First, in an area where a short-range wireless communication network LN is installed, the control unit 210 of the dedicated terminal device [200(1), 200(2)] (distribution source) and/or the control unit 310 of the general-use terminal device 300 (see left side of FIG. 17 and FIG. 18) establish(es) communication with the dedicated terminal device [200(2), 200(1)] (distribution source; see FIG. 17) or the dedicated terminal device 200(3) to 200(n) (non-distribution source) (see FIG. 18) via the short-range wireless communication unit 240 and/or the short-range wireless communication unit 340 and the short-range wireless communication network LN (Step St21). Then, communication from the dedicated terminal device [200(2), 200(1)] (distribution source) or the dedicated terminal device 200(3) to 200(n) (non-distribution sources) is waited (St22), and a standby state is continued until there is a response from the dedicated terminal device [200(2), 200 (1)] (distribution source) or the dedicated terminal device 200(3) to 200(n) (non-distribution source) (Step St22: No).

Meanwhile, the control unit 210 (see right side of FIG. 17 and FIG. 18) in the dedicated terminal device [200(2), 200(1)] (distribution source) or the dedicated terminal device 200(3) to 200(n) (non-distribution source) establishes communication with the dedicated terminal device [200(1), 200(2)] (distribution source) and/or the general-use terminal device 300 via the short-range wireless communication unit 240 and/or the short-range wireless communication unit 340 and the short-range wireless communication network LN (Step St31). Then, communication from the dedicated terminal device [200(1), 200(2)] (distribution source) and/or the general-use terminal device 300 is waited (St32), and a standby state is continued until there is a response from the dedicated terminal device [200(1), 200(2)] (distribution source) and/or the general-use terminal device 300 (Step St32: No).

Next, when there is a response from the dedicated terminal device 200(2), 200(1) (distribution source) or the dedicated terminal device 200(3) to 200(n) (non-distribution source) (Step Ss22: Yes), the control unit 210 of the dedicated terminal device 200(1), 200(2) (distribution source) and/or the control unit 310 of the general-use terminal device 300 (see left side of FIG. 17 and FIG. 18) synchronize(s) the piece of model information MI of the movable object 110 and the piece of update information RI of the updating software package WFW with the dedicated terminal device 200(2), 200(1) (distribution source) or the dedicated terminal device 200(3) to 200(n) (non-distribution source) (Step Ss23), and transmit(s) information containing the updating software package WFW (Step Ss24).

Specifically, the control unit 210 of the dedicated terminal device [200(1), 200(2)] (distribution source) and/or control unit 310 of the general-use terminal device 300 retrieves, from the storage unit 230 and/or 330, a piece of model information MI and the updating software package WFW associated with the piece of model information MI, and transmits them to the dedicated terminal device [200(2), 200(1)] (distribution source) or the dedicated terminal device 200(3) to 200(n) (non-distribution source), via the short-range wireless communication network LN and the short-range wireless communication unit 240 and/or the short-range wireless communication unit 340.

In other words, the control unit 210 of the dedicated terminal device 200(1), 200(2) (distribution source) and/or the control unit 310 of the general-use terminal device 300 (see FIG. 17) transmit(s) the model information management database DB1, the updating software management database DB2, and the updating software storing database DB3 to the dedicated terminal device 200(2), 200(1) (distribution source), via the short-range wireless communication network LN and the short-range wireless communication unit 240 and/or the short-range wireless communication unit 340. Further, the control unit 210 of the dedicated terminal device 200(1), 200(2) (distribution source) and/or the control unit 310 of the general-use terminal device 300 (see FIG. 18) transmit(s) the updating software management database DB2 and the updating software storing database DB3 to the dedicated terminal device 200(3) to 200(n) (non-distribution source) via the short-range wireless communication unit 240 or the short-range wireless communication unit 340 and the short-range wireless communication network LN.

Meanwhile, when there is a response from the dedicated terminal device 200(1), 200(2) (distribution source) and/or the general-use terminal device 300 (Step St32: Yes), the control unit 210 of the dedicated terminal device 200(2), 200(1) (distribution source) or the dedicated terminal device 200(3) to 200(n) (non-distribution source) (see right side of FIG. 17 and FIG. 18) synchronizes the piece of model information MI and the piece of update information RI of updating software package WFW of the movable object 110(1) to 110(n) with the dedicated terminal device 200(1), 200(2) (distribution source) and/or the general-use terminal device 300 (Step St33). When the software package FW for the control device [113(1) to 113(m)] is not the latest package (e.g., not the latest version, or not with the latest date and time) (Step St34: No), information containing the updating software package WFW is received (Step St35, and the information received is stored in the storage unit 230.

Specifically, the dedicated terminal device 200(2), 200(1) (distribution source) (see FIG. 17) receives the piece of model information MI and the updating software package WFW associated with the piece of model information MI from the dedicated terminal device 200(1), 200(2) (distribution source) and/or the general-use terminal device 300 via the short-range wireless communication unit 240 and/or the short-range wireless communication unit 340 and the short-range wireless communication network LN. Then, the information received is stored in the storage unit 230. Further, the dedicated terminal device 200(3) to 200(*n*) (non-distribution source) receives the updating software package WFW from the dedicated terminal device [200(1), 200(2)] (distribution source) and/or the general-use terminal device 300 via the short-range wireless communication unit 240 and/or the short-range wireless communication unit 340 and the short-range wireless communication network LN. Then, the information received is stored in the storage unit 230.

In other words, the dedicated terminal device 200(2), 200(1) (distribution source) (see FIG. 17) stores, in its storage unit 230, the model information management database DB1, the updating software management database DB2, and the updating software storing database DB3. Further, the dedicated terminal device 200(3) to 200(*n*) (non-distribution source) stores, in its storage unit 230, the updating software management database DB2, and the updating software storing database DB3.

If the software package FW for the control device [113(1) to 113(*m*)] in the terminal device [200(1) to 200(*n*)] of the movable object [110(1) to 110(*n*)] on the other end is not the latest package (e.g., not the latest version, or not with the latest date and time), the control unit 210 or the control device [113(1) to 113(*m*)] mounted in the movable object [110(1) to 110(*n*)] rewrites the software package FW for the control device [113(1) to 113(*m*)] based on the updating software package WFW.

Figure 19:
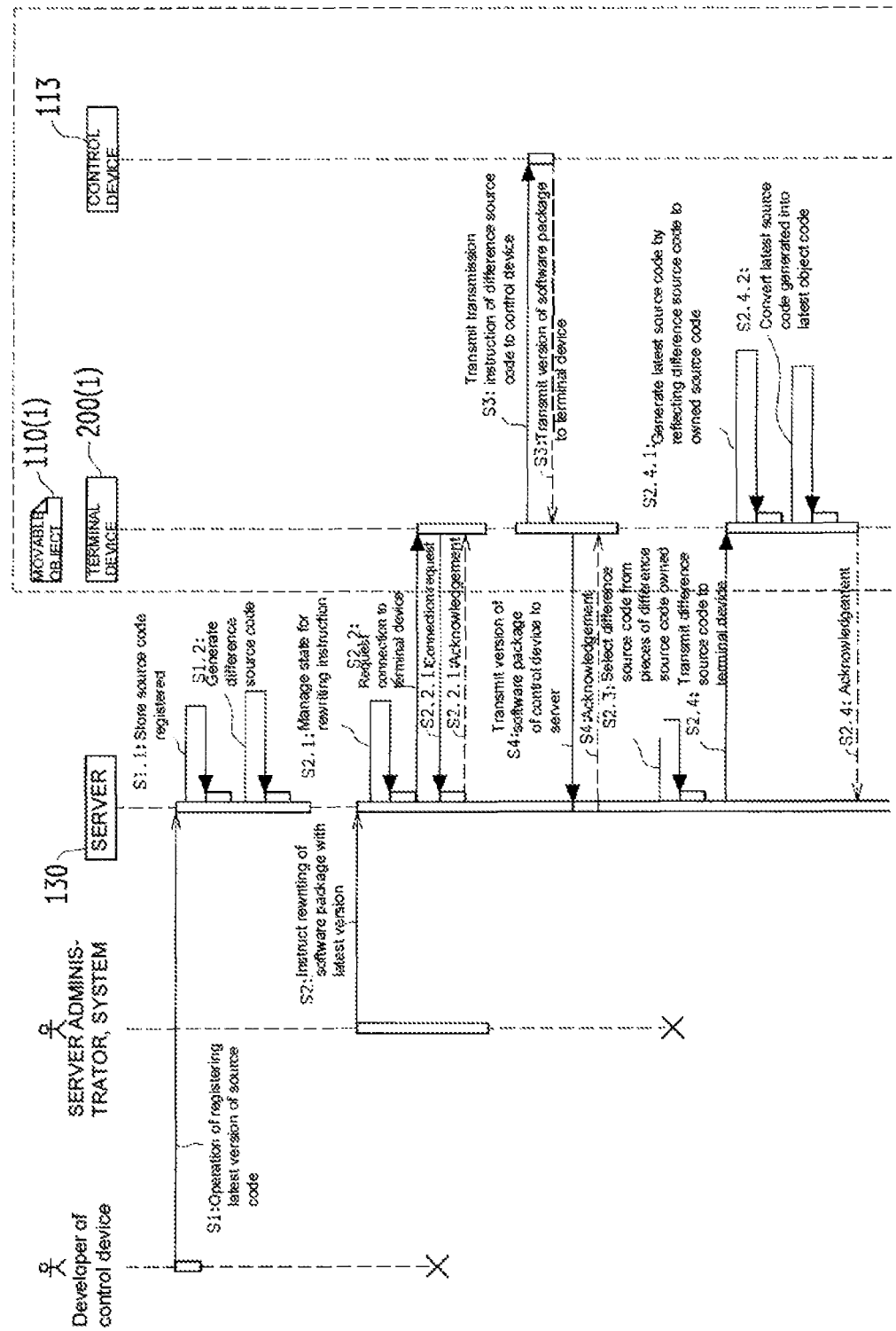
FIG. 19 is a flowchart showing an exemplary software rewriting process taking place in the software rewriting system of the first embodiment shown in FIG. 1 to FIG. 11, and shows a first half of the exemplary process.
Figure 20:
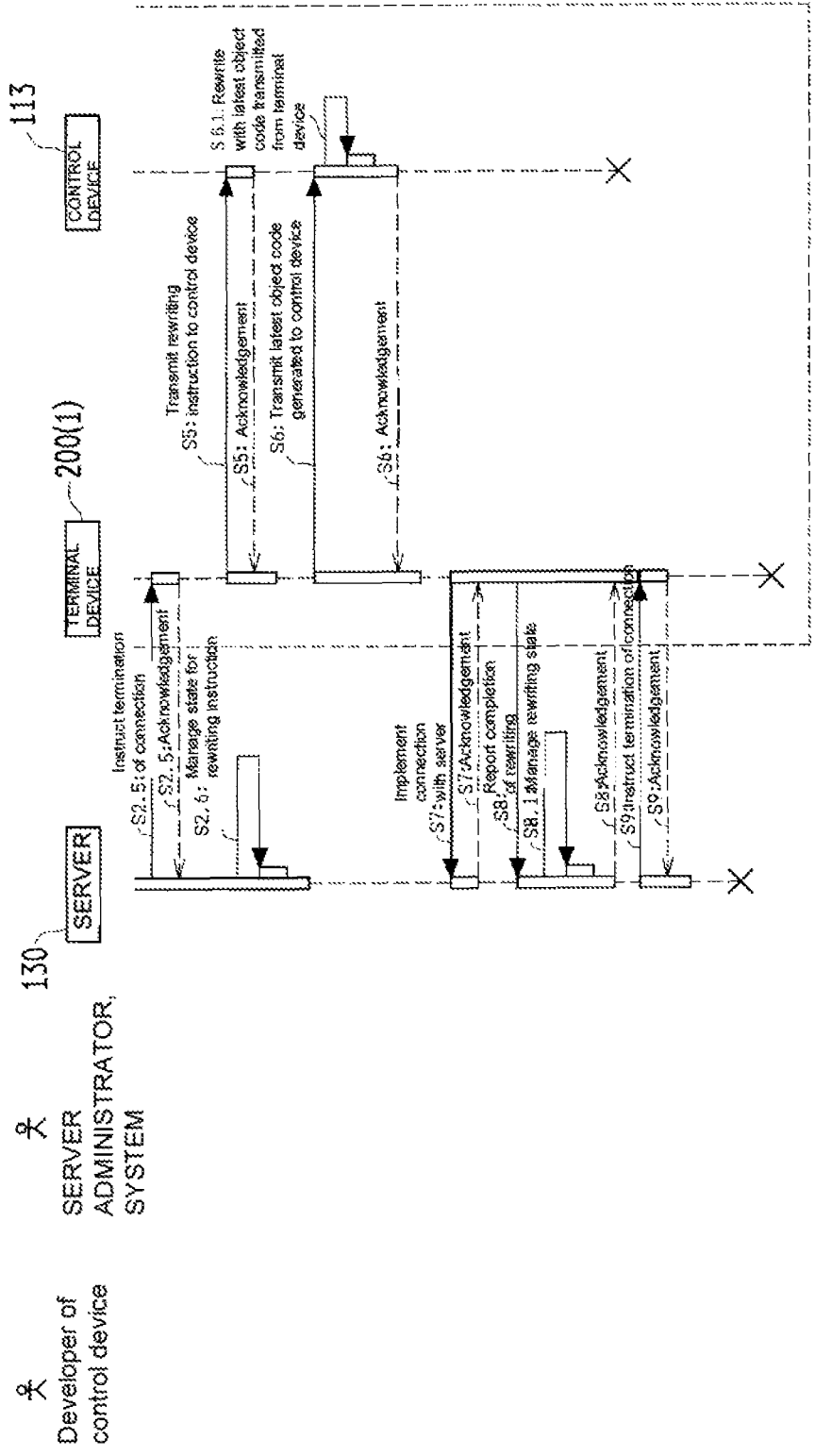
FIG. 20 is a flowchart showing an exemplary software rewriting process taking place in the software rewriting system of the first embodiment shown in FIG. 1 to FIG. 11, and shows a last half of the exemplary process.

FIG. 19 and FIG. 20 are each a flowchart showing an exemplary software rewriting process taking place in the software rewriting system 100 of the first embodiment shown in FIG. 1 to FIG. 11. FIG. 19 shows a first half of the exemplary process, whereas FIG. 20 shows a last half of the exemplary process.

In the exemplary process shown in FIG. 19 and FIG. 20, the server 130 is a stationary computer. The terminal device 200(1) (distribution source) generates the latest piece of object code NOC and rewrites the software package FW of the control device 113 mounted in the own movable object 110(1), based on the latest piece of object code NOC generated.

First, as shown in FIG. 19, in Step S1 a developer of the control device 113 registers a piece of source code SC of the latest version of the software package FW of the control device 113 in the server 130. In Step S1.1, the server 130 stores the piece of source code SC of the software package FW in its storage unit 133. At this time, if the piece of source code SC is invalid, the server 130 does not store the piece of source code SC in the storage unit 133.

Next, in step S1.2, based on the piece of source code SC of the software package FW registered and one or more pieces of source code SC of one or more older versions in the past, the server 130 generates a piece of difference source code DSC of the latest version with respect to the one or more older versions. Then, the piece of difference source code DSC generated is stored in the updating software storing database DB3.

Next, in step S2, an administrator of the server 130 and/or the system instructs the server 130 to rewrite the software package FW of the control device 113 to the latest version of the software package FW.

Next, in the step S2.1, the server 130 manages the state for the rewriting instruction from the administrator of the server 130 and/or the system. In step S2.2, the server 130 requests connection to the terminal device 200(1). At this time, in response to the connection request to the terminal device 200(1), if there is no connection from the terminal device 200(1) is received, the server 130 retries the request. Further, if there is no connection from the terminal device 200(1) even after retrial of a certain number of times, the server 130 suspends the rewriting operation and retries connection when information that the terminal device 200(1) is started to the server 130.

Next, in step S2.2.1, the terminal device 200(1) implements connection in response to the connection request from the server 130. At this time, if there is no acknowledgement from the server 130 within a certain period, the terminal device 200(1) retries the connection request. The terminal device 200(1) ends the connection if there is no acknowledgement from the server 130 even after retrial of a certain number of times. Further, the terminal device 200(1) ends the connection if a negative response is returned from the server 130.

Further, in step S2.2.1, the server 130 acknowledges connection from the terminal device 200(1) At this time, the server 130 does not respond if the connection is from an unauthorized terminal device.

Next, in step S3, the terminal device 200(1) transmits a transmission instruction of the piece of difference source code DSC to the control device 113. At this time, if the version VR of the software package FW is not transmitted from the control device 113, or if an unauthorized software version is transmitted from the control device 113, the terminal device 200(1) terminates the connection with the server 130.

Next, in step S3, the control device 113 transmits the version VR of the software package FW to the terminal device 200(1) (respond to the transmission instruction of the software package FW). At this time, the control device 113 does not respond if the instruction is from an unauthorized terminal device.

Next, in step S4, the terminal device 200(1) transmits the version VR of the software package FW of the control device 113 to the server 130. At this time, if there is no acknowledgement from the server 130 within a certain period, the terminal device 200(1) retries the connection request. The terminal device 200(1) ends the connection to the server 130 if there is no acknowledgement from the server 130 even after retrial of a certain number of times. Further, the terminal device 200(1) ends the connection to the server 130 if a negative response is returned from the server 130.

Next, in step S4, the server 130 transmits an acknowledgement, with respect to transmission of the version VR of the software package FW from the terminal device 200(1). At this time, if the version VR of the software package FW received is an unauthorized, the server 130 sends a negative response. Further, if the version VR of the software package FW is not transmitted from the terminal device 200(1) for a certain period, the server 130 terminates the connection with the terminal device 200(1).

Next, in step S2.3, the server 130 selects a piece of difference source code DSC to be transmitted to the terminal device 200(1) from the pieces of difference source code DSC stored therein.

Next, in the step S2.4, the server 130 transmits the piece of difference source code DSC to the terminal device 200(1) which is associated with the control device 113 to be subjected to rewriting. At this time, if there is no acknowledgement from the terminal device 200(1) within a certain period, the server 130 retries the connection request. If there is no acknowledgement from the terminal device 200(1) despite retrial of a certain number of times, the server 130 gives up rewriting operation (enters a rewriting-failed state). The server 130 also gives up rewriting operation (enters a rewriting-failed state) when a negative response is returned from the terminal device 200(1).

Next, in step S2.4.1, the terminal device 200(1) reflects the piece of difference source code DSC from the server 130 in the piece of source code SC of its own, and generates the latest piece of source code NSC. At this time, if the piece of difference source code DSC is not transmitted from the server 130 for a certain period, the terminal device 200(1) terminates the connection with the server 130.

Next, in step S2.4.2, the terminal device 200(1) converts (compile in this example) the latest piece of source code NSC generated into the latest piece of object code NOC, and generates the latest piece of object code NOC. At this time, if the conversion result (compile result in this example) is not good (NG), the terminal device 200(1) gives a negative response to the server 130.

Next, in step S2.4, the terminal device 200(1) gives acknowledgement to transmission of the piece of difference source code DSC from the server 130. At this time, if the conversion result (compile result in this example) is not good (NG), the terminal device 200(1) gives a negative response to the server 130.

Next, in step S2.5, the server 130 instructs termination of connection to the terminal device 200(1), as shown in FIG. 20. At this time, if there is no acknowledgement from the terminal device 200(1) within a certain period, the server 130 terminates the communication.

Next, in step S2.5, the terminal device 200(1) gives acknowledgement in response to the instruction of terminating the connection from the server 130.

Next, in step S2.6, the server 130 manages the state for a rewriting instruction from the administrator of the server 130 or the system.

Next, in step S5, the terminal device 200(1) transmits a rewriting instruction to the control device 113. At this time, if there is no acknowledgement from the control device113 within a certain period, the terminal device 200(1) retries the connection request. If acknowledgement is not received from the control device 113 despite a certain number of retrials, the terminal device 200(1) gives up the rewriting, and inform the server 130 of the failure in rewriting. If a negative response is returned in response to the rewriting instruction, the terminal device 200(1) gives up rewriting and inform the server 130 of the failure in rewriting. If the failure in rewriting is received, the server 130 switches the updated/not-updated field RVR (see FIG. 11) in the area information management database DB4 to "not-updated" (switch the value of the flag to "0").

Further, in step S5, the control device 113 gives acknowledgement in response to the rewriting instruction from the terminal device 200(1). At this time, the control device113 does not respond if the instruction is from an unauthorized terminal device.

Next, in step S6, the terminal device 200(1) transmits the latest piece of object code NOC generated to the control device 113. If a negative response is returned from the control device 113, the terminal device 200(1) inform the server 130 of a failure in rewriting. If the failure in rewriting is received, the server 130 switches the updated/not-updated field RVR (see FIG. 11) in the area information management database DB4 to "not-updated" (switch the value of the flag to "0").

Next, in step S6.1, the control device 113 performs rewriting based on the latest piece of object code NOC from the terminal device 200(1). At this time, the control device 113 returns a negative response, if rewriting with the latest piece of object code NOC is failed.

Further, in step S6, the control device 113 gives acknowledgement for the transmission of the latest piece of object code NOC from the terminal device 200(1). At this time, the control device113 does not respond if the instruction is from an unauthorized terminal device. Further, the control device 113 returns a negative response, if rewriting with the latest piece of object code NOC is failed.

Next, in step S7, the terminal device 200(1) implements connection with the server 130. At this time, if there is no acknowledgement from the server 130 within a certain period, the terminal device 200(1) retries the connection request. The terminal device 200(1) ends the connection to the server 130 if there is no acknowledgement from the server 130 even after retrial of a certain number of times. Further, the terminal device 200(1) ends the connection to the server 130 if a negative response is returned from the server 130.

Further, in step S7, the server 130 acknowledges connection from the terminal device 200(1) At this time, the server 130 does not respond if the connection is from an unauthorized terminal device.

Next, in step S8, the terminal device 200(1) transmits completion of rewriting to the server 130. If the completion of rewriting is received, the server 130 switches the updated/not-updated field RVR (see FIG. 11) in the area information management database DB4 to "updated" (switch the value of the flag to "1"). If rewriting is failed, the terminal device 200(1) inform the server 130 of a failure in rewriting. If the failure in rewriting is received, the server 130 switches the updated/not-updated field RVR (see FIG. 11) in the area information management database DB4 to "not-updated" (switch the value of the flag to "0").

Next, in step S8.1, the server 130 manages the state for a rewriting instruction from the administrator of the server 130 or the system.

Next, in step S8, the server 130 gives acknowledgement in response to the rewriting instruction from the terminal device 200(1). If the information of completion of rewriting from the terminal device 200(1) is not appropriate, the server 130 regards it as a failure in rewriting, and returns a negative response.

Next, in step S9, the server 130 instructs termination of connection to the terminal device 200(1). At this time, if there is no acknowledgement from the terminal device 200(1) within a certain period, the server 130 terminates the communication.

Next, in step S9, the terminal device 200(1) gives acknowledgement in response to the instruction of terminating the connection from the server 130.

In the above exemplary process, rewriting to the latest piece of object code NOC of the control device 113 took place in the control device 113 in the movable object 110(1) of the terminal device 200(1). However, instead of or in addition to this, the same may take place for a control device 113 in at least one other of the movable objects 110(2) to 110(n) of the terminal devices 200(2) to 200(n) through short-range wireless communication with the terminal device 200(1). Further, the instead of or in addition to the dedicated terminal device 200(1), a general-use terminal device 300 may be used. With a use of a general-use terminal device 300, the piece of object code OC of control device 113 of each of the movable objects 110(1) to 110(n) can be rewritten to the latest piece of object code NOC. The process of rewriting the software package FW can be done to a plurality of control devices 113(1) to 113(m) in the similar manner. Further, a piece of difference source code DSC can be transmitted to the other terminal device 200(2) (distribution source) instead of transmitting a piece of object code NOC. Further, the above deals with a case where it is the dedicated terminal device 200(1) (distribution source) which is the terminal device performing the wide area communication with the server 130; however, such a terminal device may be the dedicated terminal device 200(2) (distribution source). Further, although the server 130 is a stationary computer in the above example, the server 130 may be the dedicated terminal device 200(1), 200(2) and/or the general-use terminal device 300.

(Regarding the Embodiments)

In the embodiments [terminal device 200(1), 200(2) related to the first embodiment and the terminal device 300 related to the second embodiment], a piece of difference source code DSC is used. Therefore, the transmission time [in this example, the transmission time for transmitting the software package FW of the control devices 113(1) to 113(m) from the server 130 to any of the terminal devices 200(1) to 200(n)] can be shortened. Further, a latest piece of object code NSC is generated from the piece of difference source code DSC and a current piece of source code SC, the latest piece of object code NSC thus generated is converted into the latest piece of object code NOC, and the latest piece of object code NOC is transmitted to the control devices 113 to 113. That is, the latest version of the software package FW can be easily generated based on a difference in the software package FW. Therefore, the latest version of the software package FW can be reliably run in the control devices 113 to 113.

Further, by mounting the control devices 113 to 113 on the movable objects 110(1) to 110(n), the transmission time [in this example, the transmission time for transmitting the software package FW of the control devices 113(1) to 113(m) mounted in the movable objects 110(1) to 110(n) from the server 130 to the terminal devices 200(1) to 200(n)] can be shortened. Further, since the latest piece of object code NOC is transmitted to the control devices 113 to 113, the latest version of the can be easily generated based on a difference in the software package FW. Therefore, the latest version of the software package FW can be reliably run in the control devices 113 to 113 mounted in the movable objects 110(1) to 110(n).

In the first embodiment [in this example, the dedicated terminal device 200(1), 200(2) provided in the movable object], the movable object [110(1), 110(2)] includes the short-range wireless communication unit 240 configured to perform communication with at least one movable object [110(2) to 110(n); 110(1), 110(3) to 110(n) in this example] other than the movable object [110(1), 110(2)] via a short-range wireless communication network LN. Therefore, the software package FW in the control devices 113 to 113 mounted in any of the movable objects 110(1) to 110(n) can be easily rewritten within the communication range of the short-range wireless communication network LN.

In the first embodiment [in this example, the dedicated terminal device 200(1), 200(2) provided in the movable object], the latest piece of object code NOC is transmitted to the control device [113(1) to 113(m)] of the own movable object [110(1), 110(2) in this example]. This way, the software package FW of the control device [113(1) to 113(m)] mounted in the own movable object [110(1), 110(2) in this example] can be easily rewritten and updated to the latest version, based on the latest version of the software package FW. Thus, the latest version of the software package FW can be reliably run in the control device [113(1) to 113(m)] mounted in the own movable object [110(1), 110(2) in this example].

Further, in the first embodiment [in this example, the dedicated terminal device 200(1), 200(2) provided in the movable object], the latest piece of object code NOC is transmitted to at least one other movable object 110 [110(2) to 110(n); 110(1), 110(3) to 110(n) in this example] via the short-range wireless communication unit 240 and the short-range wireless communication network LN. Therefore, the software package FW of the control device [113(1) to 113(m)] mounted in the at least one other movable object can be easily rewritten and updated to the latest version. Thus, the latest version of the software package FW can be reliably run in the control device [113(1) to 113(m)] mounted in the at least one other movable object.

Further, in the first embodiment [in this example, the dedicated terminal device 200(1), 200(2) provided in the movable object], a piece of difference source code DSC is transmitted from the movable object [110(1), 110(2) in this example] (distribution source) to at least one other movable object [110(2), 110(1) in this example] via the short-range wireless communication unit 240 and the short-range wireless communication network LN. Therefore, the terminal device [200(2), 200(1) in this example] of the at least one other movable object [110(2), 110(1) in this example] can generate the latest piece of object code NOC based on the piece of difference source code DSC received. This way, the communication time between the terminal device and the other terminal device can be shortened.

In the second embodiment (in this example, the general-use terminal device 300 which is a multi-function portable communication terminal device), the terminal device 300 functions as a multi-function portable communication terminal device, and includes a short-range wireless communication unit 340 configured to perform communication with an electric device [the movable objects 110(1) to 110(n) in this example] via the short-range wireless communication network LN. Therefore, a multi-function portable communication terminal device such as a tablet computer or a smartphone can be used as the publicly-available general-use terminal device 300, and the workability in rewriting the software package FW of the control device [113(1) to 113(m)] mounted in an electric device can be improved.

Further, in the second embodiment (in this example, the general-use terminal device 300 which is a multi-function portable communication terminal device), the latest piece of object code NOC is transmitted to an electric device via the short-range wireless communication unit 340 and the short-range wireless communication network LN. Therefore, the software package FW of the control device [113(1) to 113(m)] mounted in the electric device can be easily rewritten and updated to the latest version. Thus, the latest version of the software package FW can be reliably run in the control device [113(1) to 113(m)] mounted in the electric device.

Further, in the second embodiment (in this example, the general-use terminal device 300 which is a multi-function portable communication terminal device), a piece of difference source code DSC is transmitted to an electric device [movable object 110(2), 110(1) in this example] having the generating control unit Q31 and the conversion control unit Q32, via the short-range wireless communication unit 340 and the short-range wireless communication network LN. Therefore, the latest piece of object code NOC can be generated based on the piece of difference source code DSC from the terminal device [200(2), 200(1) in this example] (distribution source) of the electric device [movable object 110(2), 110(1) in this example], and the communication time between the terminal device and the other terminal device can be shortened.

It should be noted that, if there is an extra volume the storage unit 230 or 330 of the dedicated terminal device [200(1), 200(2)] (distribution source) or the general-use terminal device 300, the server 130 may transmit the model information management database DB1, the updating software management database DB2, the updating software storing database DB3, and the area information management database DB4 containing all pieces of area information AR to the dedicated terminal device [200(1), 200(2)] (distribution source) or the general-use terminal device 300. The terminal device [200(1), 200(2), 300] may store the databases in the storage unit 230. This way, the terminal device [200(1), 200(2), 300] may serve as the server 130.

(Regarding Other Embodiments)

The software rewriting system 100 related to the above embodiment deal with a case of applying the same to agricultural traveling work machines such as combine harvesters, tillers, rice transplanters as the movable objects 110; however, application of the above-disclosed technology is not limited to them and is also applicable to construction travel work machines such as tractors, shovel cars, wheel loaders, and carriers, and to ships such as pleasure boat, fishing boat.

Further, in the above movable objects 110(1) to 110($n$), a single control device 113 is provided for a single work unit 111; however, a plurality of control devices 113 may be provided for a single work unit 111.

Further, the electric device can be an electric device used in an electric power facility such as an electric power generator, instead of the above-described movable object.

The present invention is not limited to the embodiments described above, and can be implemented in various other forms. For that reason, such embodiments are merely illustrative in all respects, and should not be construed as limiting. The scope of the present invention is indicated by the scope of the claims, and is not bound in any way in the text of the above description. Furthermore, all variations and modifications falling within the equivalent scope of the claims are within the scope of the present invention.

This application claims priority based on Japanese Patent Application No. 2016-038928 filed on Mar. 1, 2016 in Japan. The entire contents of the application is hereby incorporated by reference.

INDUSTRIAL APPLICABILITY

The present invention relates to a terminal device and a software rewriting program for use in a software rewriting system configured to rewrite a software package of a control device, which enables shortening of a transmission time by utilizing information of a difference in the software package, and even allows easier generation of the latest version of the software package based on the difference in the software packages.

REFERENCE SIGNS LIST 100 software rewriting system
110 movable object (exemplary electric device)
111 work unit
113 control device
120 remote monitoring center
130 server
131 control unit
131$a$ processing unit
131$b$ memory device
132 wide area communication unit
133 storage unit
200 dedicated terminal device
210 control unit
210$a$ processing unit
210$b$ memory device
220 wide area communication unit
230 storage unit
240 short-range wireless communication unit
250 signal communication unit
260 power source control unit
300 general-use terminal device
310 control unit
310$a$ processing unit
310$b$ memory device
320 wide area communication unit
330 storage unit
340 short-range wireless communication unit
350 user interface unit
AR area information
BT battery
CC control device code
DB updating software database
DB1 model information management database
DB2 updating software management database
DB3 updating software storing database
DB4 area information management database
DSC difference source code
FW software package
ID terminal identification information
LN short-range wireless communication network
MC model code
MI model information
MT type of movable object
NOC latest piece of object code
NSC latest piece of source code
OC object code
PP program for updating software package
Q1 reception control unit
Q11 retrieval control unit
Q2 storage control unit
Q3 rewriting control unit
Q31 generating control unit
Q32 conversion control unit
Q4 transmission control unit
RI update information
RID terminal identification information registered
RVR updated/not-updated field
SC source code
SW start switch
VR version
WFW updating software package WFWC updating software code
WN wide area network

The invention claimed is:

1. A terminal device comprising:
a processor; and
a memory configured to store one or more pieces of source code in a text format, the one or more pieces of source code for generating one or more pieces of object code in a binary format, the one or more pieces of object code executable by at least one control device, wherein the memory is further configured to store instructions that, when executed by the processor, cause the processor to:
receive, from a server, a piece of difference source code which is a difference between a second piece of source code stored in a memory of a first control device and a first piece of source code stored in the memory of the terminal device, the first piece of source code-corresponding to a first piece of object code;
receive, from the server, update information corresponding to the piece of difference source code, the update information comprising a control device code of the first control device, a model code of the first control device, and a first version number of the second piece of source code;
generate, on the terminal device, a copy of the second piece of source code based on the piece of difference source code and at least the first piece of source code;
convert, on the terminal device, the copy of the second piece of source code into a second piece of object code;
identify, by the terminal device, the first control device based on the update information;
initiate transmission of a first copy of the second piece of object code to the identified first control device from the terminal device;
receive, from a second terminal device via a short-range wireless communication, a second version number of a third piece of source code used to generate a third piece of object code, wherein the third piece of source code is stored in a memory of a second control device, and wherein the second control device includes the same model code as the first control device;
compare, by the terminal device, the first version number to the second version number; and
initiate transmission, to the second terminal device via a second short-range wireless communication, of a second copy of the second piece of object code based on the first version number being greater than the second version number indicating that the second piece of source code is a more recent version than the third piece of source code.

2. The terminal device according to claim 1, wherein the first control device is coupled to a vehicle.

3. The terminal device according to claim 2, wherein the terminal device is provided in the vehicle, and the terminal device further comprising a short-range wireless communication unit configured to perform communication with at least one other vehicle different from the vehicle, via a short-range wireless communication network.

4. The terminal device according to claim 3, wherein:
the at least one other vehicle includes the second terminal device; and
the short-range wireless communication unit is further configured to transmit the first copy of the second piece of object code to the at least one other vehicle via the short-range wireless communication network.

5. The terminal device according to claim 1, wherein:
the first control device is mounted in an electric device;
the terminal device is configured to function as multi-function portable communication terminal device; and
the terminal device includes a short-range wireless communication unit configured to perform communication with the electric device via a short-range wireless communication network.

6. The terminal device according to claim 5, wherein the short-range wireless communication unit is configured to transmit the first copy of the second piece of object code to the electric device via the short-range wireless communication network.

7. A non-transitory, computer-readable device storing instructions that, when executed by a processor, cause the processor to perform operations comprising:
receiving, at a first terminal device from a server, a piece of difference source code which is a difference between a second piece of source code stored in a memory of a first control device and a first piece of source code stored in a memory of the first terminal device, the first piece of source code corresponding to a first piece of object code, the memory of the first terminal device configured to store one or more pieces of source code in a text format corresponding to one or more pieces of object code in a binary format, the one or more pieces of object code executable by at least one control device;
receiving, at the first terminal device from the server, update information corresponding to the piece of difference source code, the update information comprising a control device code of the first control device, a model code of the first control device, and a first version number of the second piece of source code;
generating, on the first terminal device, a copy of the second piece of source code based on the piece of difference source code and at least the first piece of source code;
converting, on the first terminal device, the copy of the second piece of source code into a second piece of object code;
identifying, by the first terminal device, the first control device based on the update information;
initiating transmission of a first copy of the second piece of object code to the identified first control device from the first terminal device to rewrite a software package at the identified first control device;
receive, from a second terminal device via a short-range wireless communication, a second version number of a third piece of source code used to generate a third piece of object code, wherein the third piece of source code is stored in a memory of a second control device, and wherein the second control device includes the same model code as the first control device;
compare, by the first terminal device, the first version number to the second version number; and
initiating transmission, to the second terminal device via a second short-range wireless communication, of a second copy of the second piece of object code based on the first version number being greater than the second version number indicating that the second piece of source code is a more recent version than the third piece of source code.

8. A method comprising:
receiving, at a first terminal device from a server, difference source code and update information corresponding to the difference source code, the difference source code representing a difference between a second piece of source code stored in a memory of a first control device and a first piece of source code stored in a memory of the first terminal device, the update information comprising a control device code of the first control device, a model code of the first control device, and a first version number of the second piece of source code;

generating, at the first terminal device, a copy of the second piece of source code based on the difference source code and at least the first piece of source code, the first piece of source code stored in a text format and corresponding to a first object code stored in a binary format;

converting, at the first terminal device, the copy of the second piece of source code into a second piece of object code;

identifying, by the first terminal device, the first control device based on the update information;

transmitting a first copy of the second piece of object code from the first terminal device to the identified first control device for rewriting of a software package at the first control device;

receiving, from a second terminal device via a short-range wireless communication, a second version number of a third piece of source code used to generate a third piece of object code, wherein the third piece of source code is stored in a memory of a second control device, and wherein the second control device includes the same model code as the first control device;

comparing, by the first terminal device, the first version number to the second version number; and transmitting, to the second terminal device via a second short-range wireless communication, a second copy of the second piece of object code based on the first version number being greater than the second version number indicating that the second piece of source code is a more recent version than the third piece of source code.

9. The method of claim 8, wherein the update information further comprises area information.

10. The method of claim 8, further comprising:
storing the update information in one or more databases at the memory of the first terminal device.

11. The method of claim 10, wherein the one or more databases include a model information management database, an updating software management database, an updating software storing database, or a combination thereof.

12. The method of claim 8, wherein:
the first terminal device and the first control device are integrated in a vehicle; and
the control device code comprises one or more engine control unit (ECU) symbols, a number, both.

13. The method of claim 12, wherein:
the vehicle comprises one or more actuators configured to control an aspect of the vehicle; and
the first control device is configured to control the one or more actuators.

14. The method of claim 8, wherein generating the copy of the second piece of source code comprises combining the difference source code with at least a portion of the first piece of source code stored at the memory of the first terminal device.

15. The method of claim 8, wherein converting the copy of the second piece of source code comprises compiling the copy of the second piece of source code into the first copy of the second piece of object code.

16. The method of claim 8, further comprising:
deleting the difference source code after initiating transmission of the first copy of the second piece of object code to the first control device.

17. The method of claim 8, further comprising:
determining successful transmission of the first copy of the second piece of object code to the first control device; and
transmitting, to the server, an acknowledgement indicating that the first control device is updated.

18. The method of claim 8, wherein:
the first control device is integrated into a work machine; and
the work machine comprises one of a combine harvester, a traveling work unit, a reaping work unit, a threshing work unit, and a ship.

19. The method of claim 8, wherein:
a terminal device identifier of the first terminal device is mapped to area information at the server; and
the area information indicates a control area of a vehicle coupled to or including the first terminal device.

\* \* \* \* \*